United States Patent
Fujiwara

(10) Patent No.: US 9,533,648 B2
(45) Date of Patent: Jan. 3, 2017

(54) VEHICLE FAR SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/953,215

(22) Filed: Nov. 27, 2015

(65) Prior Publication Data

US 2016/0159306 A1 Jun. 9, 2016

(30) Foreign Application Priority Data

Dec. 3, 2014 (JP) ................................ 2014-245259

(51) Int. Cl.
| | |
|---|---|
| *B60R 21/16* | (2006.01) |
| *B60R 21/207* | (2006.01) |
| *B60R 21/231* | (2011.01) |
| *B60R 21/2338* | (2011.01) |

(52) U.S. Cl.
CPC ......... *B60R 21/207* (2013.01); *B60R 21/2338* (2013.01); *B60R 21/23138* (2013.01); *B60R 2021/161* (2013.01); *B60R 2021/23146* (2013.01); *B60R 2021/23161* (2013.01); *B60R 2021/23382* (2013.01); *B60R 2021/23386* (2013.01)

(58) Field of Classification Search
CPC .................... B60R 21/207; B60R 2021/23146
USPC ...................... 280/728.1, 728.2, 730.1, 730.2
See application file for complete search history.

(56) References Cited

U.S. PATENT DOCUMENTS

| | | | |
|---|---|---|---|
| 6,231,068 B1* | 5/2001 | White, Jr. ............. | B60R 21/207 280/728.2 |
| 7,669,889 B1* | 3/2010 | Gorman ................ | B60R 21/207 280/730.2 |
| 8,807,591 B2* | 8/2014 | Nakata ................... | D05B 23/00 280/728.3 |
| 2005/0236819 A1 | 10/2005 | Riedel et al. | |
| 2011/0049852 A1 | 3/2011 | Kibat et al. | |
| 2012/0049498 A1 | 3/2012 | Wiik et al. | |
| 2013/0200599 A1* | 8/2013 | Shamoto ................ | B60N 2/289 280/730.2 |
| 2015/0166003 A1* | 6/2015 | Fujiwara ............... | B60R 21/207 280/730.2 |

(Continued)

FOREIGN PATENT DOCUMENTS

| | | |
|---|---|---|
| JP | 2005-306377 A | 11/2005 |
| JP | 2011-057208 A | 3/2011 |

(Continued)

*Primary Examiner* — Toan To
(74) *Attorney, Agent, or Firm* — Oliff PLC

(57) ABSTRACT

In a vehicle far side airbag device, a far side airbag is fixed to a seatback frame using stud bolts of an inflator. The far side airbag includes a bag portion at a face opposite a side face of the seatback frame. A support plate is retained in the bag portion and is fixed to the seatback frame using the stud bolts. The support plate is formed to be longer to both sides in a vehicle vertical direction than the inflator, and is engaged with the seatback frame at the vehicle upper side relative to the inflator. During inflation and expansion of the far side airbag, the support plate supports the far side airbag at both sides in the vehicle vertical direction of the inflator.

13 Claims, 34 Drawing Sheets

(56) References Cited

U.S. PATENT DOCUMENTS

| | | | | |
|---|---|---|---|---|
| 2015/0239423 A1* | 8/2015 | Hayashi | ............... | B60R 21/231 280/729 |
| 2015/0367804 A1* | 12/2015 | Fujiwara | ........... | B60R 21/23138 280/730.2 |
| 2016/0114757 A1* | 4/2016 | Fujiwara | ........... | B60R 21/23138 280/729 |

FOREIGN PATENT DOCUMENTS

| | | |
|---|---|---|
| JP | 2012-051557 A | 3/2012 |
| JP | 2014-019393 A | 2/2014 |
| JP | 2014-054956 A | 3/2014 |

\* cited by examiner

VEHICLE FAR SIDE AIRBAG DEVICE

CROSS-REFERENCE TO RELATED APPLICATION

This application is based on and claims priority under 35 USC 119 from Japanese Patent Application No. 2014-245259, filed on Dec. 3, 2014, which is incorporated by reference herein.

TECHNICAL FIELD

The present invention relates to a vehicle far side airbag device equipped with a far side airbag that inflates and expands from a side portion at a vehicle width direction middle side of a seatback of a vehicle seat.

RELATED ART

An airbag device (a far side airbag device) recited in Japanese Patent Application Laid-Open (JP-A) No. 2014-054956 is installed in a vehicle in which plural seats are arranged side by side. When an impact force acts from one side of the arrangement direction of the plural seats, this airbag device causes an airbag to inflate, so as to protrude in a direction to forward of an occupant, from a rear-reclining portion of a seat at a further side (a far side) that is further from the side at which the impact force acts. This airbag is provided with a bag main body, which protects the occupant from the chest to the head, and a tether for position regulation of the bag main body.

A mounting portion to a seat frame is provided at a rear end portion of a lower portion of the bag main body. An inflator that generates gas for inflation is accommodated inside this mounting portion. The inflator is provided with a pair of upper and lower mounting bolts (stud bolts). The inflator, together with the mounting portion of the bag main body, is fixed to a vertical frame portion (a side frame) of the seat frame using the pair of stud bolts.

When the inflation is complete, the tether is disposed at the far side face side, away from the side from which the impact force acts, of the bag main body. One end side of the tether is joined to a distal end side along the protrusion direction of the bag main body when the inflation is complete. The other end side of the tether is fixed to a far side face of the vertical frame portion using the pair of mounting bolts. Thus, when the inflation is complete, movement of the distal end side of the bag main body to the side to which the impact force acts is regulated by the tether and the occupant may be properly protected.

This airbag device is provided with a support member that is formed in a substantial "L" shape in a sectional view as seen in a vertical direction of the rear-reclining portion. The support member includes a fixing wall portion and an end face support portion. The fixing wall portion is fixed to the vertical frame portion. The end face support portion extends to the side to which the impact force acts from a rear end of the fixing wall portion. The end face support portion is structured so as to, when the inflation of the bag main body is complete, abut against a rear end face of the mounting portion of the bag main body and support the rear end face from the seat rearward side thereof.

In the airbag device described above, the bag main body (the far side airbag) is fixed to the seat frame only at the two positions of the pair of upper and lower stud bolts. Therefore, when the bag main body is being inflated and expanded by the gas for inflation, there may be great swinging of an upper portion and a lower portion of the bag main body. Thus, there is scope for improvement in regard to stabilizing an expansion action of the bag main body.

SUMMARY

In consideration of the circumstances described above, an object of the present invention is to provide a vehicle far side airbag device that contributes to stabilization of an expansion action of a far side airbag.

A vehicle far side airbag device according to a first aspect includes: an inflator in a vehicle width direction middle side side portion of a seatback of a vehicle seat, the inflator being provided to oppose a side face of a seat frame, being fixed to the seat frame using stud bolts, and generating gas for inflation when operated; a far side airbag that is stowed in the side portion in a folded state, the inflator being accommodated inside the far side airbag and the far side airbag being fixed to the seat frame using the stud bolts of the inflator, being inflated and expanded by the gas for inflation, and including a support plate retention portion at a face opposite the side face; and a support plate that is retained at the side plate retention portion, the support plate being fixed to the seat frame using the stud bolts, being formed to be longer to both sides in a vehicle vertical direction than the inflator, and being engaged with the seat frame at the vehicle upper side relative to the inflator.

In the first aspect, when the inflator provided in the side portion at the vehicle width direction middle side of the seatback of the vehicle seat is operated, the far side airbag is inflated and expanded by the gas for inflation that is generated from the inflator. The far side airbag is fixed to the seat frame using the stud bolts of the inflator, and includes the support plate retention portion at the face opposite the side face of the seat frame. The support plate is retained at the support plate retention portion and the support plate is fixed to the seat frame using the stud bolts of the inflator. The support plate is formed to be elongated to both sides in the vehicle vertical direction relative to the inflator and is engaged with the seat frame at the vehicle upper side relative to the inflator. During the inflation and expansion of the far side airbag, the support plate supports the far side airbag at both sides in the vehicle vertical direction of the inflator. Consequently, swinging of an upper portion and lower portion of the far side airbag may be reduced, which contributes to stabilization of the expansion action of the far side airbag.

In a vehicle far side airbag device according to a second aspect, in the first aspect, the support plate retention portion is a bag portion, and the support plate is inserted inside the bag portion.

In the second aspect, the bag portion is provided at the far side airbag, at the face opposite the side face of the seat frame. Thus, the support plate may be retained at the face opposite of the far side airbag by a simple structure.

In a vehicle far side airbag device according to a third aspect, in the first aspect or the second aspect, the support plate is engaged with the seat frame by a hook portion formed at an upper end portion of the support plate being hooked onto the seat frame.

In the third aspect, the upper end portion of the support plate is engaged with the seat frame by the hook portion formed at the upper end portion of the support plate being hooked onto the seat frame. Thus, the upper end portion of the support plate may be engaged with the seat frame by a simple structure.

In a vehicle far side airbag device according to a fourth aspect, in any one of the first to third aspects, a non-inflating portion is provided at a vertical direction middle portion of the far side airbag and, in an inflated and expanded state of the far side airbag, an upper end portion of the support plate is disposed at the vehicle upper side relative to a lower end of the non-inflating portion.

In the fourth aspect, in the inflated and expanded state of the far side airbag, the upper end portion of the support plate is disposed as described above. Therefore, during the inflation and expansion of the far side airbag, during restraint of an occupant and the like, unintended folding of the lower end of the non-inflating portion of the far side airbag may be prevented or inhibited.

In a vehicle far side airbag device according to a fifth aspect, in any one of the first to third aspects, an upper-and-lower partition portion that partitions the far side airbag into upper and lower is provided at a vertical direction middle portion of the far side airbag and, in an inflated and expanded state of the far side airbag, an upper end portion of the support plate is disposed at the upper side of the seatback relative to the upper-and-lower partition portion.

In the fifth aspect, in the inflated and expanded state of the far side airbag, the upper end portion of the support plate is disposed as described above. Therefore, during the inflation and expansion of the far side airbag, during restraint of an occupant and the like, unintended folding of the upper-and-lower partition portion of the far side airbag may be prevented or inhibited.

A vehicle far side airbag device according to a sixth aspect further includes, in any one of the first to fifth aspects, a tether of which one end portion is anchored at the far side airbag, an other end portion of the tether being fixed to the seat frame using the stud bolts in a state in which the other end portion of the tether is sandwiched between the seat frame and the support plate.

In the sixth aspect, provided the dimensions of the tether are specified such that the tether is subject to tension in the inflated and expanded state of the far side airbag, the expansion action of the far side airbag may be stabilized by this tension.

As described above, a vehicle far side airbag device according to the present invention contributes to stabilization of the expansion action of a far side airbag.

DETAILED DESCRIPTION

First Exemplary Embodiment

Figure 1:
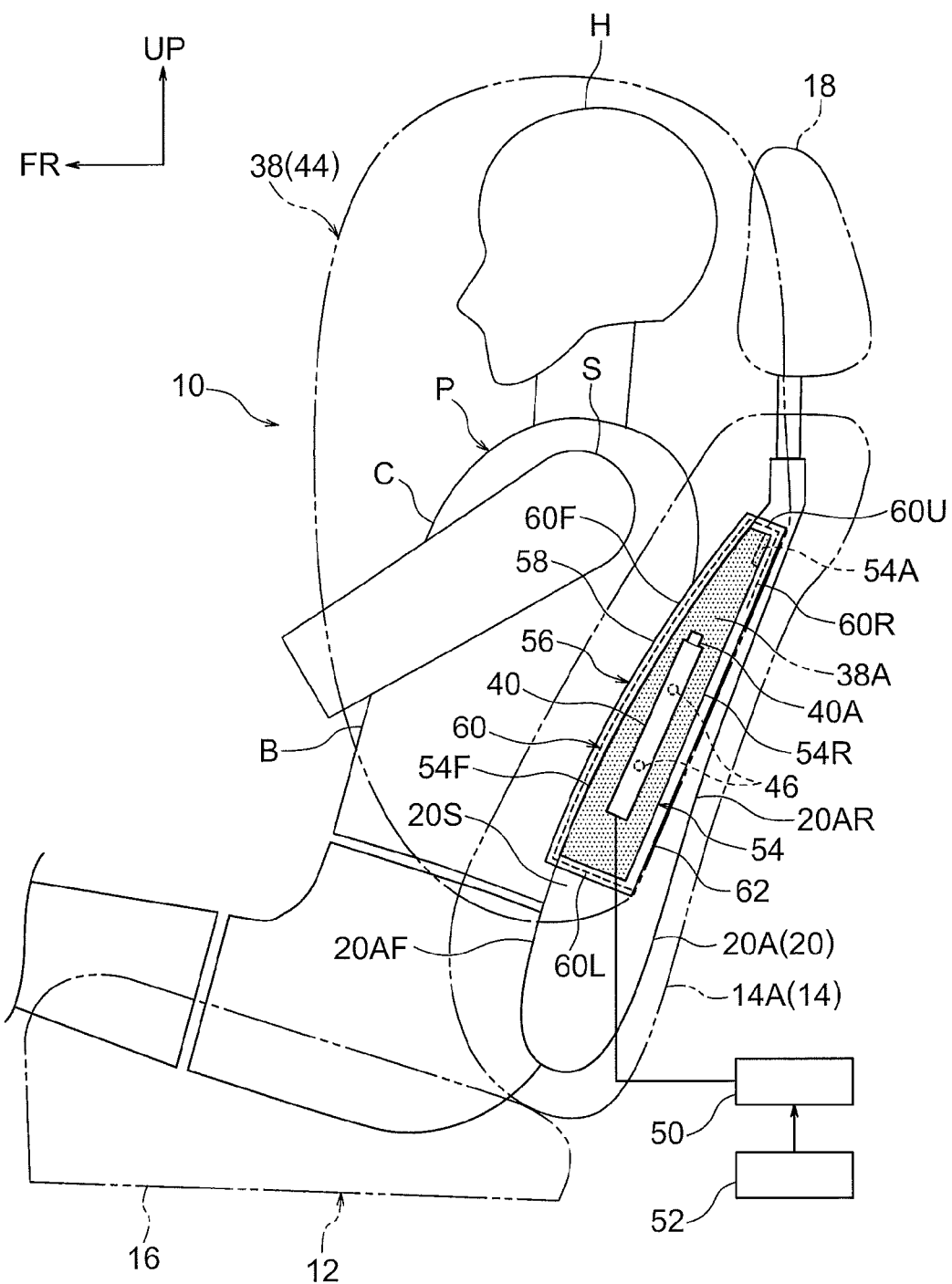
FIG. 1 is a side view of a vehicle seat at which a vehicle far side airbag device in accordance with an exemplary embodiment of the present invention is installed, viewed from a vehicle width direction middle side thereof, which is a diagram illustrating an inflated and expanded state of a far side airbag.

Herebelow, a vehicle far side airbag device (hereinafter referred to as "the FS airbag device") 10 according to a first exemplary embodiment of the present invention is described using FIG. 1 to FIG. 8. An arrow FR, an arrow UP and an arrow OUT that are shown where appropriate in the drawings indicate, respectively, a forward direction (a progress direction) of the vehicle, an upward direction and outward in a width direction. Below, where descriptions are given simply using directions to longitudinal, lateral, and vertical, unless particularly specified, these refer to front and rear in the vehicle longitudinal direction, left and right in the vehicle lateral direction (the vehicle width direction), and up and down in the vehicle vertical direction.

—Structure—

Figure 2:
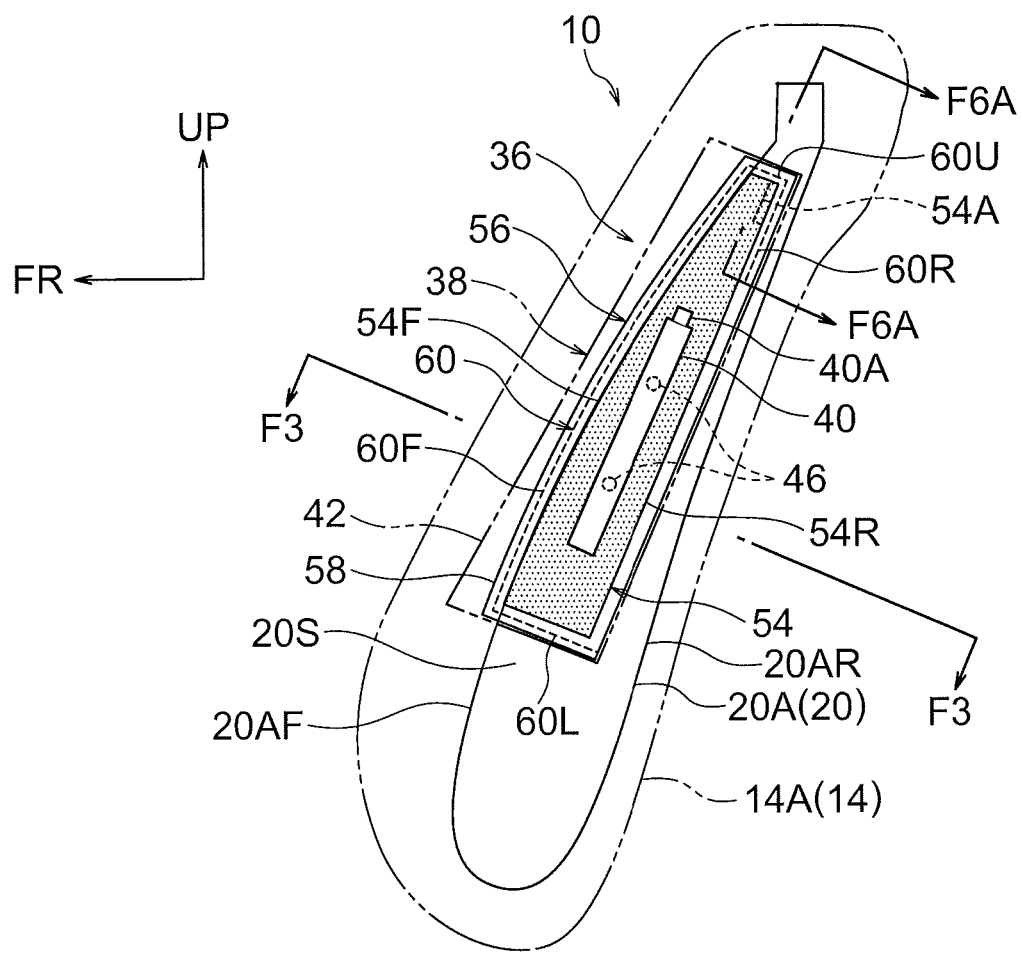
FIG. 2 is a side view corresponding to a portion of FIG. 1, illustrating a state before the inflation and expansion of the far side airbag of the vehicle far side airbag device.
Figure 3:
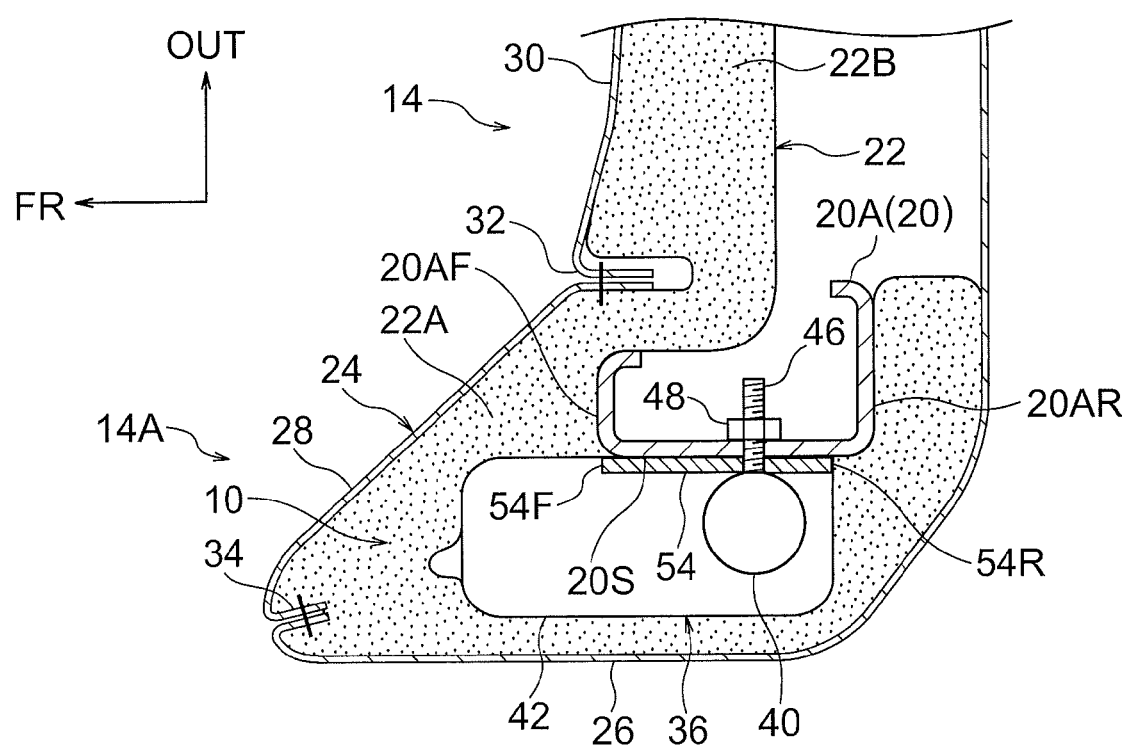
FIG. 3 is a magnified sectional view showing a magnification in a plane cut along line F3-F3 in FIG. 2.

As shown in FIG. 1 to FIG. 3, the FS airbag device 10 according to the present exemplary embodiment is provided at a side portion 14A (hereinafter referred to simply as "the middle side side portion 14A") at the vehicle width direction middle side of a seatback 14 of a vehicle seat 12. The vehicle seat 12 is, for example, the driver seat of a right-hand drive car. The seatback 14 of the vehicle seat 12 is tiltably connected to a rear end portion of a seat cushion 16, and a headrest 18 is connected to an upper end portion of the seatback 14.

In the present exemplary embodiment, the longitudinal direction, lateral direction (width direction) and vertical direction of the vehicle seat 12 coincide with the longitudinal direction, the lateral direction and the vertical direction of the vehicle. In FIG. 1, a crash test dummy P is seated on the vehicle seat 12 in place of an actual occupant. The dummy P is, for example, a WorldSID (World Side Impact Dummy) AM50 dummy (representing the 50th percentile of American adult males). The dummy P is seated in a standard sitting attitude designated in impact testing methods. A longitudinal position of the seat cushion 16 relative to the vehicle and an inclination position (inclination angle) of the seatback 14 relative to the seat cushion 16 are adjusted to standard specified positions corresponding to the above-mentioned sitting attitude. Below, in order to facilitate understanding of the descriptions, the dummy P is referred to as "the occupant P".

In the above-mentioned seatback 14, as shown in FIG. 3, a seatback pad 22, which is mounted to a seatback frame 20 that is a seat frame, is covered by a seat cover 24. The seatback frame 20 constitutes a frame of the seatback 14. The seatback frame 20 is provided with lateral side frames 20A that extend in the height direction of the seatback 14 at both the lateral sides of the seatback 14 (the side frame 20A at the seat right side is not shown in FIG. 1 to FIG. 3).

The seatback pad 22 constitutes a cushion member of the seatback 14. The seatback pad 22 is integrally provided with a pad side portion 22A disposed at the middle side side portion 14A and a pad central portion 22B disposed at the central side of the seatback 14. The seat cover 24 constitutes a cover member of the seatback 14. The seat cover 24 is provided with a side cover 26, a front side cover 28, and a front cover 30. The side cover 26 covers the pad side portion 22A from the seat width direction outer side and the seat rear side thereof. The front side cover 28 covers the pad side portion 22A from the seat front side thereof. The front cover 30 covers the pad central portion 22B from the seat front side thereof. The side cover 26 extends to the rear face side of the seatback 14.

A seat width direction inner side end portion of the front side cover 28 and a seat width direction outer side end portion of the front cover 30 are stitched to one another (sewn together) at a stitched portion 32 that is disposed at a seat width direction inner side end portion of the middle side side portion 14A. A seat width direction outer side end portion of the front side cover 28 and a seat front side end portion of the side cover 26 are stitched to one another at a stitched portion 34 that is disposed at a front end portion (referred to as a "frame portion") of the middle side side portion 14A. The stitched portion 34 extends in the height direction of the seatback 14 along the frame portion of the middle side side portion 14A.

As shown in FIG. 2 and FIG. 3, a far side module 36 is accommodated in the middle side side portion 14A. The far side module 36 constitutes principal portions of the FS airbag device 10. The far side module 36 is provided with a far side airbag (hereinafter referred to as "the FS airbag") 38 and an inflator 40, which is stowed in the FS airbag 38. The FS airbag 38 is not shown in the drawing of FIG. 3.

This FS airbag 38 is formed as what is known as a single chamber-type airbag in this case. The FS airbag 38 is formed in a long, narrow bag shape by, for example, a single base cloth 44, which is formed by cutting of a base cloth material based on nylon or polyester, being folded in two and outer periphery edge portions thereof being stitched at outer periphery stitched portions, which are not shown in the drawings. The FS airbag 38 is inflated and expanded to the vehicle width direction middle side relative to the occupant P (see the FS airbag 38 shown by two-dot chain lines in FIG. 1) by the pressure of gas generated from the inflator 40. During this inflation and expansion, the aforementioned stitched portion 34 is subject to inflation pressure from the FS airbag 38 and ruptures. Hence, the FS airbag 38 inflates and expands to the outer side (the front side and upper side) of the middle side side portion 14A. At this time, the pad side portion 22A is ruptured to left and right at the rear of the stitched portion 34.

In the present exemplary embodiment, the meaning of the term "inflated and expanded state" includes a state just before inflation and expansion of the FS airbag 38 is completed and the occupant P is restrained by the FS airbag 38 (a non-restraining inflation and expansion completion state), and the meaning of the tee n "during inflation and expansion" includes states in which inflation and expansion of the FS airbag 38 has started but before the inflation and expansion is completed (inflation and expansion in progress states).

The above-mentioned FS airbag 38 is formed so as to substantially form a long, narrow cylinder shape along the vehicle vertical direction if viewed from sideward in the inflated and expanded state (from the vehicle width direction middle side in this case), as illustrated by the two-dot chain lines in FIG. 1. The FS airbag 38 is formed with a size that may protect the occupant P from the head H to the abdomen B (the head H, the shoulder S, the chest C and the abdomen B). The size of the FS airbag 38 is not limited by the above description; it is sufficient if the occupant P may be protected at least from the head H to the chest C.

At usual times, the FS airbag 38 is formed into a module together with the inflator 40 and a support plate 54. In a state in which the FS airbag 38 is folded up in a predetermined manner of folding such as bellows folding, roll folding or the like (bellows folding in this case), the FS airbag 38 is covered by a wrapping material 42 (not shown in the drawing of FIG. 5) that ruptures easily. The front, rear, vertical directions of the FS airbag 38 recited in the descriptions below, unless particularly specified, refer to directions of the FS airbag 38 in the inflated and expanded state, and substantially match the front, rear, vertical directions of the vehicle.

The inflator 40 is a "cylinder-type" gas generation device that is formed in a cylindrical shape. The inflator 40 is accommodated at a rear end portion of a lower portion of the interior of the FS airbag 38. The inflator 40 is disposed to sideward of the side frame 20A (inward in the vehicle width direction) in an attitude arranged along the vertical direction of the seatback 14. The inflator 40 opposes a side face 20S of the side frame 20A, which is a side face of the seatback frame 20, from inward thereof in the vehicle width direction. A pair of upper and lower stud bolts 46 protrude outward in the vehicle width direction from the inflator 40. The stud bolts 46 penetrate through the base cloth 44 of the FS airbag 38 and the side frame 20A, and nuts 48 are screwed onto distal end sides of the stud bolts 46. Thus, the inflator 40 and the FS airbag 38 are fastened and fixed to the side frame 20A using the stud bolts 46.

An ECU 50 (control device) that is installed in the vehicle is electronically connected to the inflator 40. A side collision sensor 52 that detects a side collision of the vehicle is electronically connected to the ECU 50. The ECU 50 and the side collision sensor 52 are structural members of the FS airbag device 10. When a side collision (or the impossibility of avoiding a side collision) of the vehicle is detected on the basis of signals from the side collision sensor 52, the ECU 50 operates (activates) the inflator 40. More specifically, given that the FS airbag device 10 according to the present exemplary embodiment is installed in the vehicle seat 12 that is a driving seat of a right-hand drive vehicle, the inflator 40 is operated when the ECU 50 detects an impact by another vehicle against a side portion at the passenger seat side of the vehicle (a left side portion).

When the inflator 40 operates, gas for inflation (hereinafter referred to simply as "the gas") is jetted out into the FS airbag 38 through a gas jetting-out portion 40A that is provided at one of an upper end portion and a lower end portion of the inflator 40 (in this case, the upper end portion). Hence, the FS airbag 38 inflates and expands. If a pre-crash sensor that predicts (forecasts) a side collision is electronically connected to the ECU 50, the inflator 40 may be operated when the ECU 50 predicts a side collision on the basis of signals from the pre-crash sensor.

Principal Portions of the Present Exemplary Embodiment

Now, principal portions of the present exemplary embodiment are described.

Figure 4:
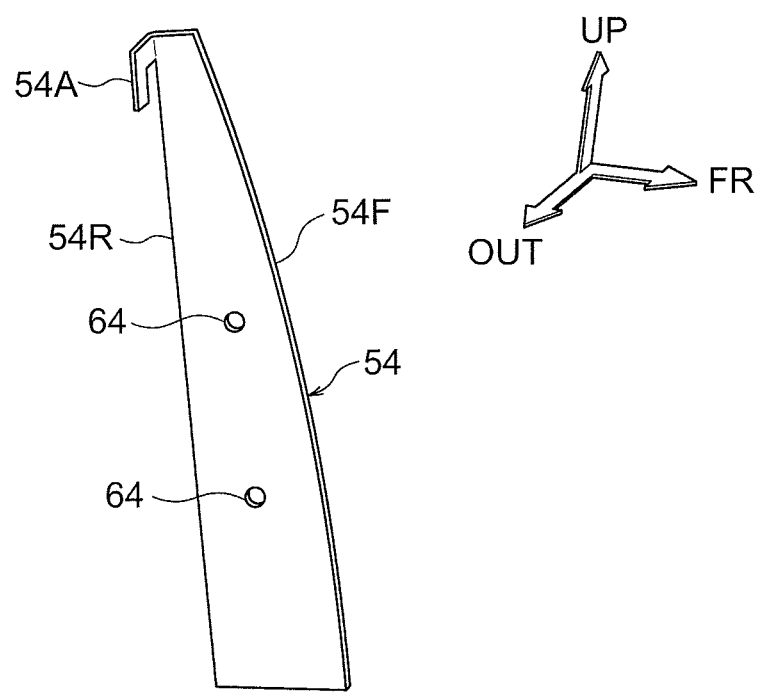
FIG. 4 is a perspective view of a support plate provided at the vehicle far side airbag device.

As shown in FIG. 1 to FIG. 3, in the present exemplary embodiment the support plate 54 is disposed between a rear end portion of a lower portion of the FS airbag 38 and the side face 20S of the side frame 20A. In FIG. 1, FIG. 2, FIG. 7 and FIG. 8, the support plate 54 is stippled in order to facilitate recognition of the support plate 54. As shown in FIG. 4, the support plate 54 is formed in a long, narrow plate shape, and is disposed in an attitude in which the length direction of the support plate 54 is along the height direction of the seatback 14 and the plate thickness direction of the support plate 54 is along the seat width direction (the vehicle width direction). A material that is used as the support plate 54 may be, for example, an aluminium alloy, a carbon fiber resin or the like. In the present exemplary embodiment, the support plate 54 is formed in a flat plate shape (which includes flat plates and objects that have a flat plate shape overall). The support plate 54 is disposed only at the vehicle width direction outer side (the side at which the side frame 20A is disposed) relative to the folded FS airbag 38 (the far side module 36).

A front edge 54F of the support plate 54 (see FIG. 1 to FIG. 5; the reference symbol 54F is not shown in other drawings) is specified with a shape so as to run along a front edge 20AF of the side frame 20A as viewed in the vehicle width direction (see FIG. 1 to FIG. 3; the reference symbol 20AF is not shown in other drawings). The support plate 54 is structured so as to protrude to the seatback 14 front side relative to the front edge 20AF. Similarly, a rear edge 54R of the support plate 54 (see FIG. 1 to FIG. 5; the reference symbol 54R is not shown in other drawings) is specified with a shape so as to run along a rear edge 20AR of the side frame 20A (see FIG. 1 to FIG. 3; the reference symbol 20AR is not shown in other drawings). The support plate 54 is structured so as to protrude to the seatback 14 rear side relative to the rear edge 20AR. An upper portion side of the support plate 54 is formed such that the vehicle longitudinal direction dimension thereof decreases toward the upper end side thereof. A vertical direction dimension of the support plate 54 is formed to be slightly shorter than a vertical direction dimension of the far side module 36. In the inflated and expanded state of the FS airbag 38, the upper end of the support plate 54 is disposed near to the center of a rear end portion of the FS airbag 38 in the vertical direction, and the lower end of the support plate 54 is disposed close to a lower end portion of the rear end portion of the FS airbag 38.

Figure 5:
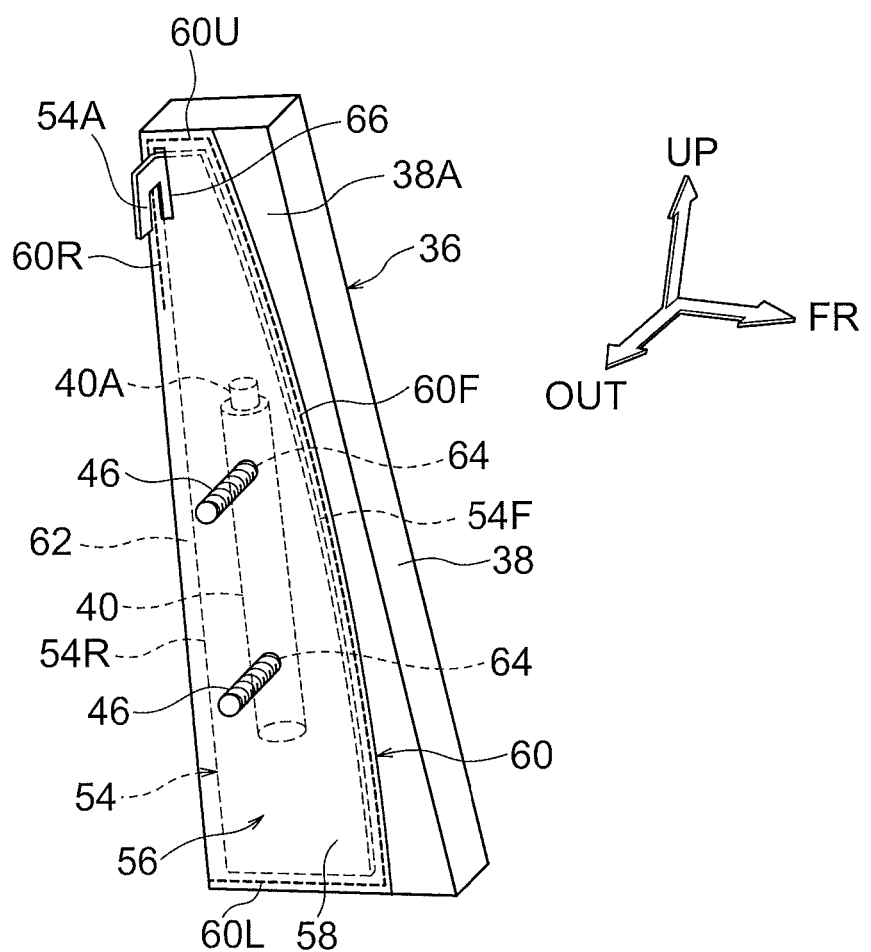
FIG. 5 is a perspective view illustrating a state in which the far side airbag is folded up and the support plate is retained at the far side airbag.

In the present exemplary embodiment, a bag portion 56 is provided at the rear end portion of the lower end portion of the FS airbag 38, at a face opposite 38A the side face 20S (see FIG. 5). The bag portion 56 serves as a support plate retention portion that retains the support plate 54. The bag portion 56 is formed in a bag shape by a base cloth material 58, which is formed of the same material as the base cloth 44 of the FS airbag 38, being stitched to the base cloth 44. The base cloth material 58 is formed in a shape that is a similar shape to the support plate 54 as viewed in the vehicle width direction but is slightly larger than the support plate 54. An outer periphery edge portion of the base cloth material 58 is stitched to the base cloth 44 at a stitched portion 60.

The stitched portion 60 is provided with an upper portion 60U and a lower portion 60L, and with a front portion 60F and a rear portion 60R. The upper portion 60U and lower portion 60L extend in the longitudinal direction along an upper edge portion and a lower edge portion of the base cloth material 58. The front portion 60F and rear portion 60R extend in the vertical direction along a front edge portion and a rear edge portion of the base cloth material 58. The rear portion 60R is not provided at a vertical direction middle portion and a lower portion of the rear edge portion of the base cloth material 58. A support plate insertion aperture 62 is formed at places at which the rear portion 60R is not provided (i.e., a non-stitched portion). The support plate insertion aperture 62 communicates between the interior and exterior of the bag portion 56.

The support plate 54 is inserted into the bag portion 56 through the above-described support plate insertion aperture 62 and is accommodated in the bag portion 56. Hence, the support plate 54 is retained by the bag portion 56 and the support plate 54 is integrally mounted (restrained) at the FS airbag 38. The support plate 54 is formed to be longer to both sides in the vehicle vertical direction than the inflator 40 accommodated in the FS airbag 38. A pair of upper and lower bolt holes 64 are formed at a vertical direction middle portion of the support plate 54. The upper and lower stud bolts 46 of the inflator 40 are inserted through the bolt holes 64. The stud bolts 46 that are inserted through the bolt holes 64 penetrate through the base cloth material 58 and the side frame 20A and are screwed into the aforementioned nuts 48. Thus, the support plate 54 is fastened and fixed to the side frame 20A using the upper and lower stud bolts 46.

A hook portion 54A is formed at the upper end portion of the support plate 54 that is disposed at the vehicle upper side relative to the inflator 40. The support plate 54 protrudes to the seat width direction inner side (the vehicle width direction inner side). The hook portion 54A is inserted through a hook insertion hole 66 that is formed in the upper end portion of the base cloth material 58, and protrudes to the outer side of the bag portion 56. The hook insertion hole 66 is a long hole that is vertically long. An engaging hole 68 (see FIG. 6A), which is a long hole that is vertically long, is formed in an upper portion of the side frame 20A in correspondence with the hook portion 54A. The hook portion 54A is inserted into the engaging hole 68. A distal end portion of the hook portion 54A projects (inflects) to the vehicle lower side, and hooks onto an edge portion of the engaging hole 68 from the seat width direction inner side. Thus, the upper end portion of the support plate 54 is engaged with the side face 20S of the seatback frame 20.

Figure 6A:
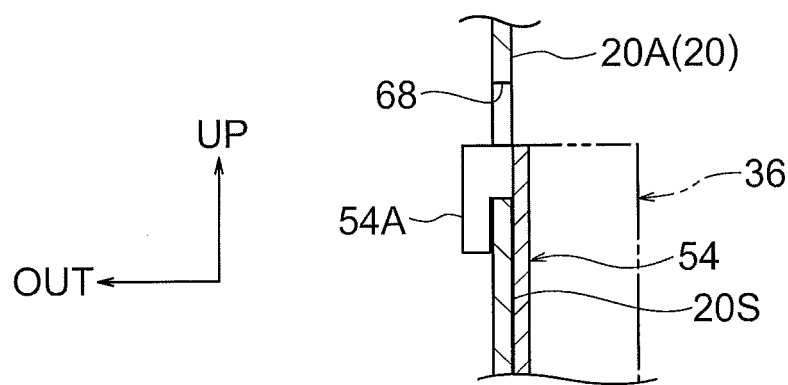
FIG. 6A is a magnified sectional view showing a magnification in a plane cut along line F6A-F6A in FIG. 2, which is a diagram illustrating a state in which a hook portion formed at an upper end portion of the support plate is hooked onto an edge portion of an engaging hole of a seat frame.
Figure 6B:
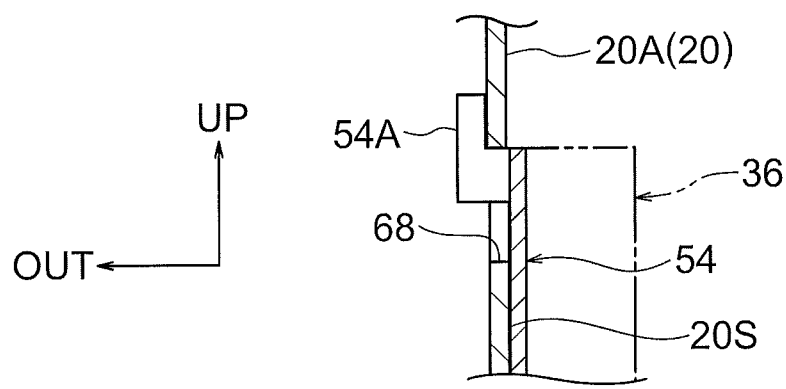
FIG. 6B is a sectional view corresponding to FIG. 6A, showing a first variant example of the hook portion.
Figure 6C:
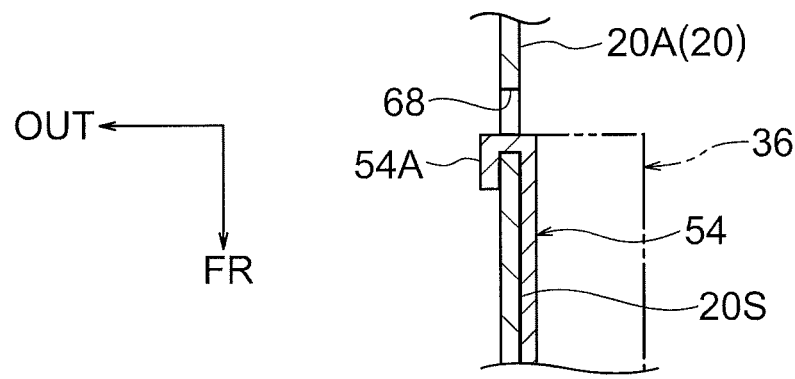
FIG. 6C is a plan sectional view showing a second variant example of the hook portion.
Figure 6D:
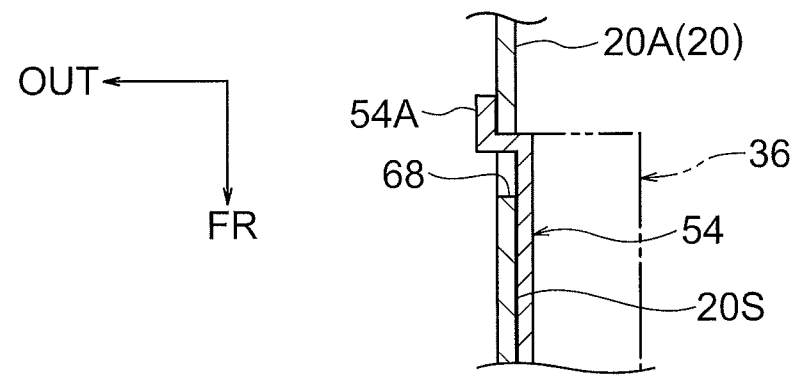
FIG. 6D is a plan sectional view showing a third variant example of the hook portion.
Figure 7:
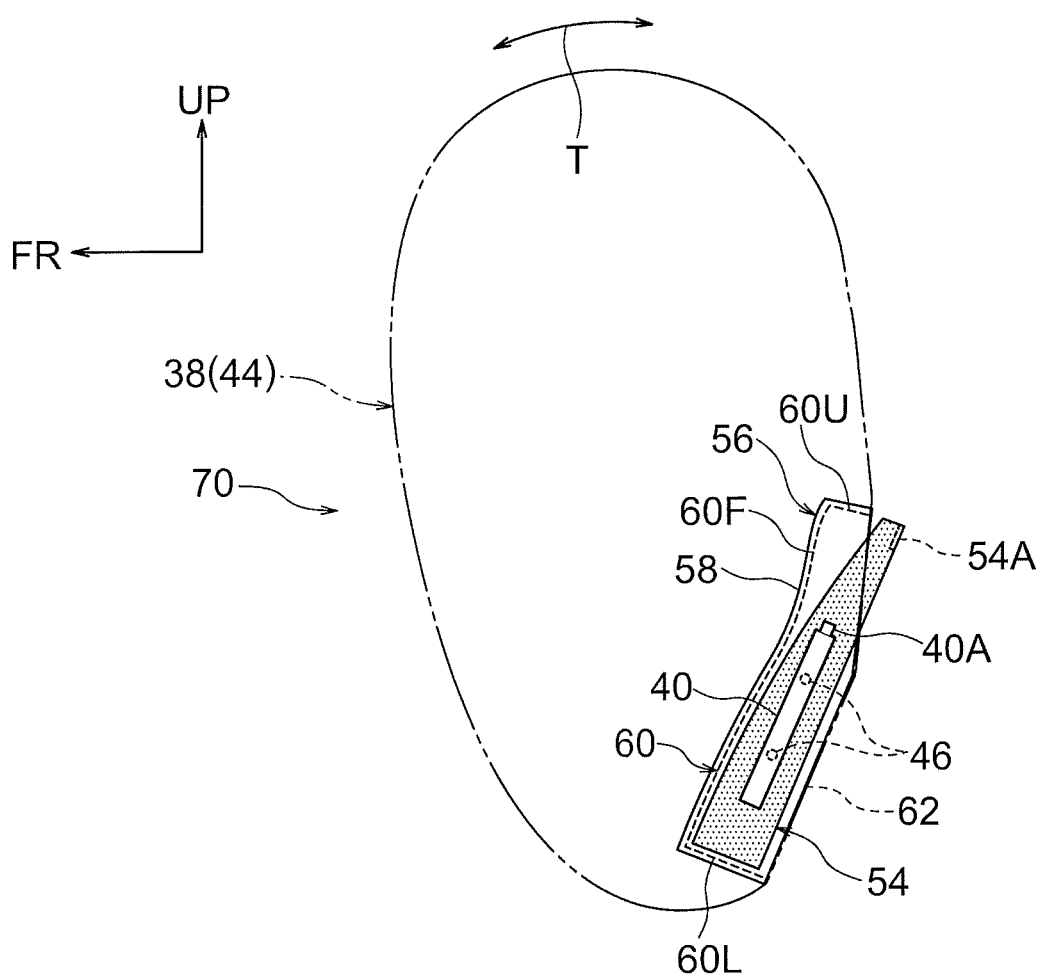
FIG. 7 is a side view corresponding to a portion of FIG. 1, illustrating a state in which an upper end portion of a support plate is disengaged from a bag portion during inflation and expansion of a far side airbag in accordance with a comparative example.

The present exemplary embodiment has a structure in which the distal end portion of the hook portion 54A projects to the vehicle lower side but this is not limiting. As illustrated in FIG. 6B, a structure is possible in which the distal end portion of the hook portion 54A projects to the vehicle upper side. As illustrated in FIG. 6C, a further structure is possible in which the distal end portion of the hook portion 54A projects to the vehicle forward side, and as illustrated in FIG. 6D, a structure is possible in which the distal end portion of the hook portion 54A projects to the vehicle rearward side. In FIG. 6C and FIG. 6D, structures around the hook portion 54A are shown by a plan sectional view seen from upward of the seatback 14. Furthermore, the present exemplary embodiment has a structure in which the hook portion 54A is formed at the upper end portion of the support plate 54 but this is not limiting. The hook portion 54A (engaging portion) may engage the support plate 54 with the seatback frame 20 at the vehicle upper side relative to the inflator 40.

—Operation and Effects—

Next, operation and effects of the present first exemplary embodiment are described.

In the FS airbag device 10 with the structure described above, the inflator 40 is operated when the ECU 50 detects a side collision on the basis of signals from the side collision sensor 52, and gas is jetted out into the FS airbag 38 through the gas jetting-out portion 40A of the inflator 40. As a result, the FS airbag 38 inflates and expands at the vehicle width direction middle side of the occupant P, and the occupant P is restrained (protected), from the head H to the abdomen B, from the vehicle width direction middle side thereof by the FS airbag 38.

The FS airbag 38 is fixed to the seatback frame 20, using the upper and lower stud bolts 46 of the inflator 40, and includes the bag portion 56 at the face opposite 38A the side face 20S of the seatback frame 20. The support plate 54 is retained in the bag portion 56 and the support plate 54 is fixed to the seatback frame 20 using the upper and lower stud bolts 46. The support plate 54 is formed to be longer to both sides in the vehicle vertical direction than the inflator 40, and the support plate 54 is engaged with the seatback frame 20 at the vehicle upper side relative to the inflator 40. During the inflation and expansion of the FS airbag 38, the support plate 54 supports the FS airbag 38 at both sides of the inflator 40 in the vehicle vertical direction. As a result, swinging of an upper portion and a lower portion of the FS airbag 38 may be reduced, which contributes to stabilization of the expansion action of the FS airbag 38, that is, contributes to an improvement in expansion performance of the FS airbag 38.

In addition, in the present exemplary embodiment, the upper end portion of the support plate 54 is engaged with the seatback frame 20 at the vehicle upper side relative to the inflator 40 as described above. Consequently, during the inflation and expansion of the FS airbag 38, unintended displacement (deformation) of the upper portion of the support plate 54 to either side in the vehicle longitudinal direction or to the vehicle width direction middle side relative to the seatback frame 20 may be prevented. Therefore, the support plate 54 may effectively stabilize the expansion action of the FS airbag 38 retained by the bag portion 56. That is, even if the rigidity of the support plate 54 is reduced by a reduction in a thickness dimension of the support plate 54 or the like, unintended deformation of the support plate 54 at the vehicle upper side relative to the inflator 40 may be prevented. Thus, this contributes to a reduction in weight of the support plate 54.

During occupant restraint by the FS airbag 38, a vertical direction central vicinity of the rear end portion of the FS airbag 38 is supported by the support plate 54 at the vehicle upper side relative to the inflator 40. Thus, displacement of the FS airbag 38 toward the vehicle width direction middle side may be suppressed. Hence, occupant restraint performance by the FS airbag 38 may be improved.

In an airbag device described in a text of the background art, a rear end face of an attachment portion of a bag main body is supported during inflation and expansion from the seat rear side thereof by an end face support portion of a support member. However, this bag main body is fastened and fixed to a support member and a seat frame only at the two positions of a pair of upper and lower stud bolts. Consequently, when the bag main body is being inflated and expanded, there may be great swinging of an upper portion of the bag main body in the vehicle longitudinal direction and great swinging of a lower portion of the bag main body in the vehicle vertical direction (unintended rising to the vehicle upper side). In regard thereto, in the present exemplary embodiment the support plate 54 is accommodated in the bag portion 56 provided at the FS airbag 38 and the support plate 54 is restrained from the upper end portion to the lower end portion thereof at the FS airbag 38. Therefore, the FS airbag 38 may be supported during inflation and expansion using the whole length of the support plate 54. As a result, swinging of the upper portion and lower portion of the FS airbag 38 may be effectively suppressed.

Further, in an airbag device described in a text of the background art, a bag main body receives an expansion reaction force to seat forward from an end face support portion during the inflation and expansion. As a result, the bag main body may forcefully inflate and expand to seat forward from the side portion of the seat. Therefore, if the bag main body inflates and expands in a state in which an occupant is disposed at an inappropriate position (out of position) in front of the side portion of the seat, a load received by the out-of-position occupant may be large. With regard thereto, in the present exemplary embodiment the support plate 54 is disposed at the FS airbag 38 at the face opposite 38A the side face 20S of the seatback frame 20. Thus, the support plate 54 is not disposed to the vehicle rear (seat rearward) relative to the FS airbag 38. Therefore, an expansion reaction force toward the vehicle front on the FS airbag 38 from the support plate 54 may not be applied, and the forcefulness of inflation and expansion of the FS airbag 38 toward the vehicle front may be restrained. As a result, a load received by an out-of-position occupant may be reduced.

In the present exemplary embodiment, the bag portion 56 is provided at the FS airbag 38 at the face opposite 38A the side face 20S of the seatback frame 20, and the support plate 54 is inserted inside the bag portion 56. Therefore, the support plate 54 may be retained at the face opposite 38A of the FS airbag 38 by a simple structure. Further, the support plate 54 may be mounted to the far side module 36 with ease and unintended detachment of the support plate 54 from the far side module 36 may be prevented. Thus, fabrication operations of the FS airbag device 10 and a mounting operation of the far side module 36 to the seatback 14 may be made simple.

In the present exemplary embodiment, the upper end portion of the support plate 54 is engaged with the seatback frame 20 by the hook portion 54A formed at the upper end portion of the support plate 54 being hooked onto the edge portion of the engaging hole 68 formed in the seatback frame 20. Thus, the upper end portion of the support plate 54 may be engaged with the seatback frame 20 by a simple structure. Moreover, when the far side module 36 to which the support plate 54 has been assembled is being mounted at the seatback frame 20, because it is sufficient for the hook portion 54A to simply be hooked on the edge portion of the engaging hole 68, a mounting operation of the far side module 36 to the seatback frame 20 may be made simple.

The present exemplary embodiment has a structure such that the front edge 54F and rear edge 54R of the support plate 54 project in the vehicle longitudinal direction beyond the front edge 20AF and rear edge 20AR of the side frame 20A. In addition, the support plate 54 is formed in a flat plate shape and is disposed only at the vehicle width direction outer side relative to the far side module 36. Therefore, for example, if an occupant P collides with the middle side side portion 14A from the vehicle forward side or the vehicle rearward side thereof, the occupant P may be prevented from colliding with the support plate 54, which is excellent in regard to assuring standards known as internal collision requirements.

In the present exemplary embodiment, the stitched portion 60 of the base cloth material 58 that forms the bag portion 56 encloses the upper end portion of the support plate 54 from the vehicle front, the vehicle upward and the vehicle rear thereof with the front portion 60F, the upper portion 60U and the rear portion 60R. Thus, the upper end portion of the support plate 54 may be prevented from unintendedly coming out from the bag portion 56 during the inflation and expansion of the FS airbag 38. That is, if the stitched portion 60 were not provided with the rear portion 60R, for example, as in the comparative example 70 shown in FIG. 7, the upper end portion of the support plate 54 might come out from the bag portion 56 during the inflation and expansion of the FS airbag 38 and the upper end portion of the FS airbag 38 might swing greatly (see arrow T in FIG. 7). However, in the present exemplary embodiment this may be avoided.

Figure 8:
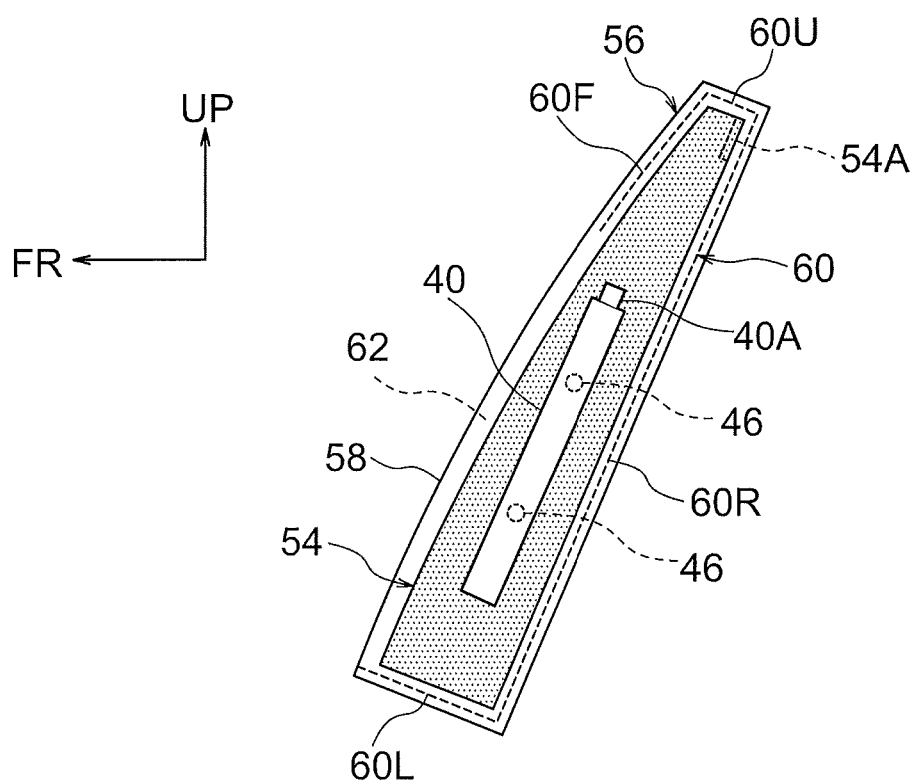
FIG. 8 is a side view corresponding to a portion of FIG. 1, showing a variant example of a stitched portion of the bag portion of the far side airbag in accordance with the first exemplary embodiment.

The first exemplary embodiment described above has a structure in which the support plate insertion aperture 62 is formed by the rear portion 60R of the stitched portion 60 not being provided at the vertical direction middle portion and lower portion of the rear edge portion of the base cloth material 58, but the present invention is not limited thus. For example, as shown in FIG. 8, a structure is possible in which the support plate insertion aperture 62 is formed by the front portion 60F of the stitched portion 60 not being provided at a vertical direction middle portion and a lower portion of the front edge portion of the base cloth material 58.

Now, alternative exemplary embodiments of the present invention are described. Structures and operations that are basically the same as in the first exemplary embodiment are assigned the same reference numerals as in the first exemplary embodiment and are not described.

Second Exemplary Embodiment

Figure 9:
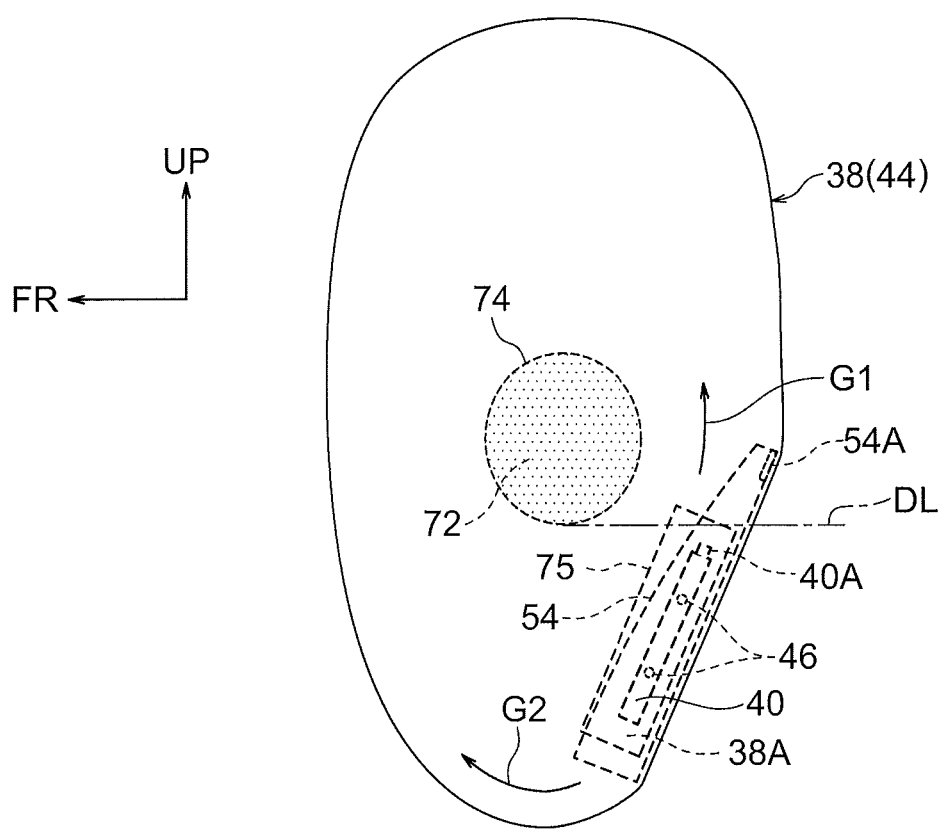
FIG. 9 is a side view in which an inflated and expanded state of a far side airbag in accordance with a second exemplary embodiment of the present invention is viewed from the vehicle width direction middle side thereof.
Figure 10:
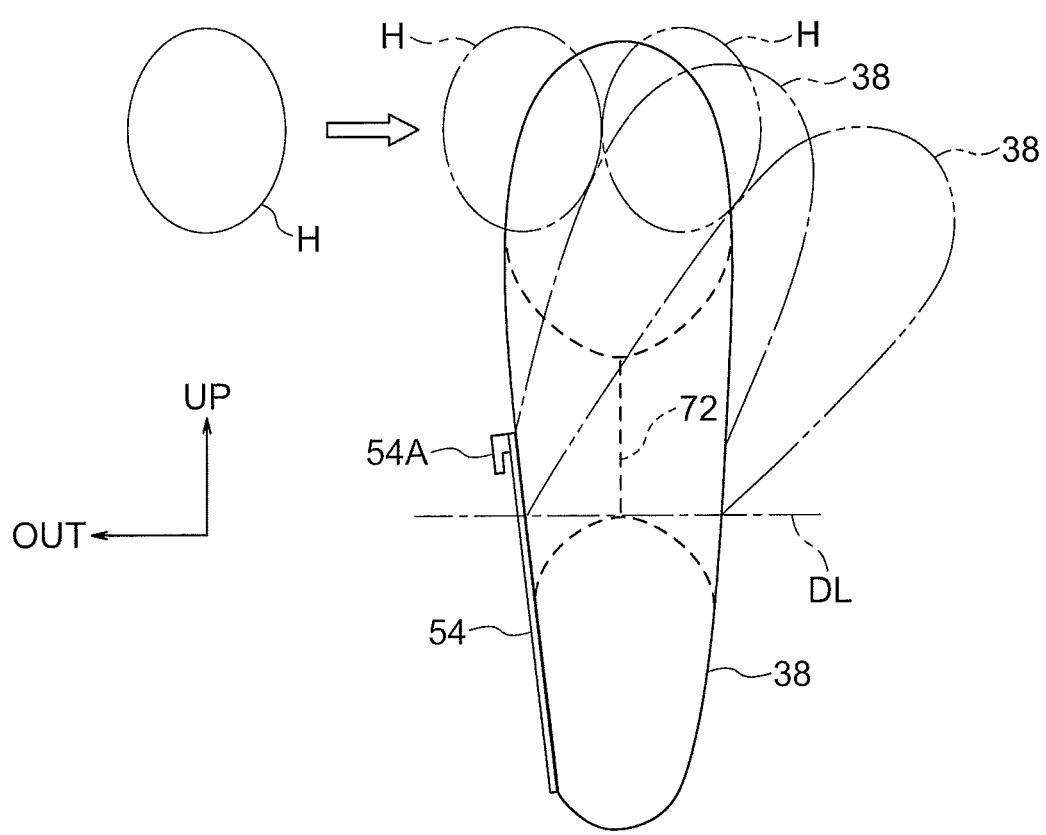
FIG. 10 is a front view schematically showing the inflated and expanded state of the far side airbag in accordance with the second exemplary embodiment, which is a diagram for describing states when the head of an occupant is being restrained by the far side airbag.

FIG. 9 shows a side view in which the inflated and expanded state of the FS airbag 38 in accordance with a second exemplary embodiment of the present invention is viewed from the vehicle width direction middle side. FIG. 10 shows the inflated and expanded state of the FS airbag 38 in a schematic front view. Note that, for ease of understanding of the drawings, the bag portion 56 is not shown in the drawings of FIG. 9, FIG. 11, FIG. 12, FIG. 14, FIG. 16 to FIG. 19, FIG. 21, and FIG. 24 to FIG. 30.

In this exemplary embodiment, the inflator 40 is accommodated at the inner side of a tubular diffuser (an inner tube) 75, and the gas jetted out from the inflator 40 is distributed vertical by the diffuser 75 (see arrows G1 and G2 in FIG. 9). In addition, in this exemplary embodiment a non-inflating portion 72 for inflation regulation is provided at a vertical direction middle portion of the FS airbag 38 (a central side if the inflated and expanded state of the FS airbag 38 is viewed in the vehicle width direction). Other structures are the same as in the first exemplary embodiment.

The above-mentioned non-inflating portion 72 is formed by the base cloth 44 being stitched by a substantially circular stitched portion 74 (not shown in the drawing of FIG. 10). Thus, the non-inflating portion 72 is structured so as to restrict inflation of a portion of the FS airbag 38 that restrains the shoulder S of an occupant P (not shown in the drawing of FIG. 9). Therefore, the inflating and expanding FS airbag 38 interfering with the shoulder S and passing to the vehicle width direction middle side may be prevented or inhibited.

The present exemplary embodiment has a structure in which, in the inflated and expanded state of the FS airbag 38, the upper end portion of the support plate 54, including the hook portion 54A, is disposed at the vehicle upper side relative to a lower end of the non-inflating portion 72 (the upper side relative to the single-dot chain line DL shown in FIG. 9). Therefore, during the inflation and expansion of the FS airbag 38, unintended folding of the FS airbag 38 at the lower end of the non-inflating portion 72 with low stiffness may be prevented or inhibited, and the expansion action of the FS airbag 38 may be stabilized.

Because folding of the FS airbag 38 at the lower end of the non-inflating portion 72 may be prevented or inhibited even during occupant restraint by the FS airbag 38, occupant restraint performance may be improved. That is, if the FS airbag 38 were to fold over to the vehicle width direction middle side from the lower end of the non-inflating portion 72 when a load was inputted to the FS airbag 38 from the head H of the occupant P, there would be a large displacement of the head H to the vehicle width direction middle side (see the FS airbag 38 and the head H shown by two-dot chain lines in FIG. 10). In contrast, in the present exemplary embodiment, the FS airbag 38 folds over to the vehicle width direction middle side at the height of the upper end of the support plate 54 that is disposed at the vehicle upper side relative to the lower end of the non-inflating portion 72. Therefore, displacement of the head H to the vehicle width direction middle side may be reduced (see the FS airbag 38 and head H shown by single-dot chain lines in FIG. 10).

Third Exemplary Embodiment

Figure 11:
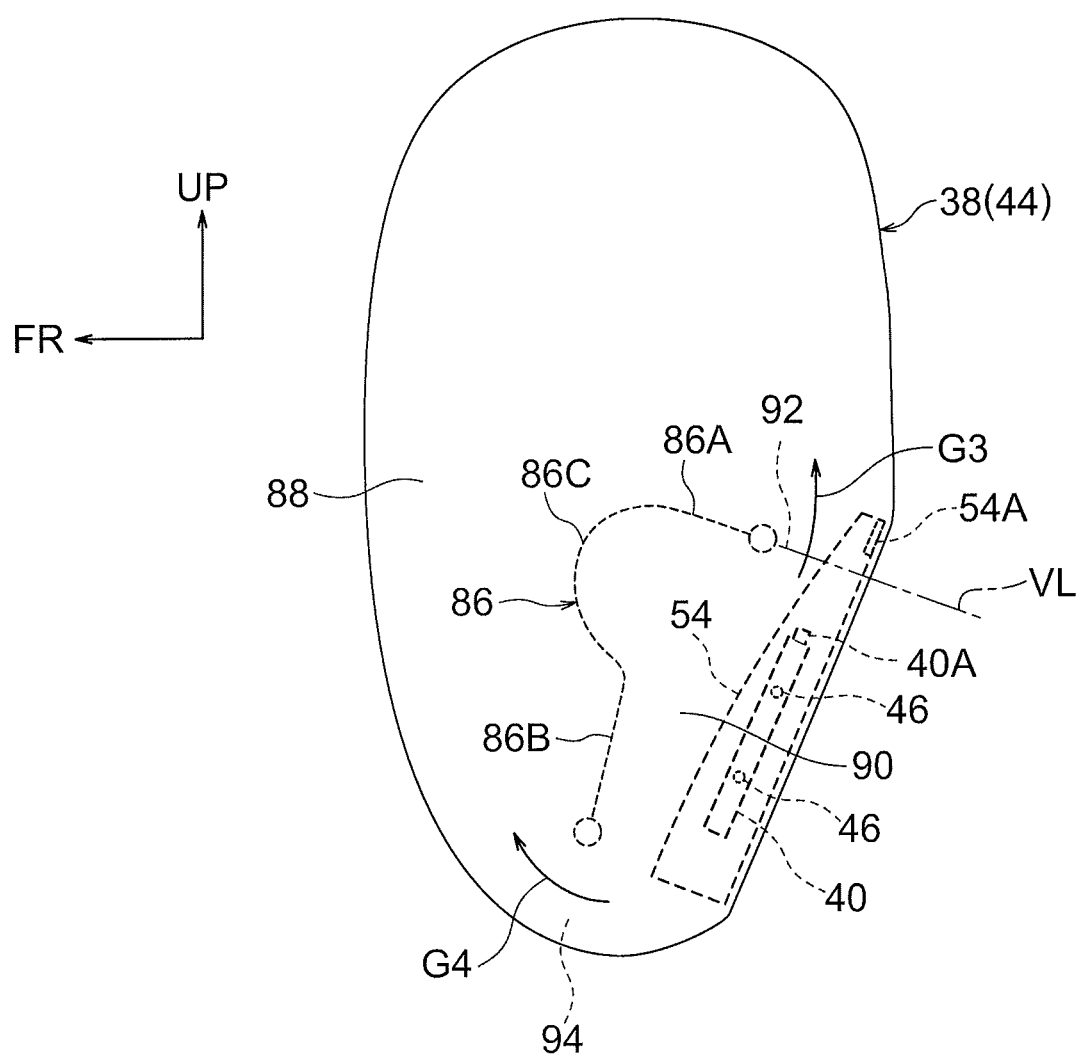
FIG. 11 is a side view in which an inflated and expanded state of a far side airbag in accordance with a third exemplary embodiment of the present invention is viewed from the vehicle width direction middle side thereof.

FIG. 11 shows a side view in which the inflated and expanded state of the FS airbag 38 in accordance with a third exemplary embodiment of the present invention is viewed from the vehicle width direction middle side thereof. In this exemplary embodiment, the FS airbag 38 is partitioned into a front chamber 88 and a rear chamber 90 by a partition portion 86. Other structures are the same as in the first exemplary embodiment.

The above-mentioned partition portion 86 is structured by a stitched portion at which the base cloth 44 is stitched. The partition portion 86 is provided with an upper-and-lower partition portion 86A at a vertical direction central portion of the FS airbag 38 and a longitudinal partition portion 86B at a longitudinal direction central portion of the FS airbag 38. The upper-and-lower partition portion 86A extends toward the central side from the rear end side of the FS airbag 38. The longitudinal partition portion 86B extends toward the central side from the lower end side of the FS airbag 38. The upper-and-lower partition portion 86A partitions a rear portion of the FS airbag 38 into upper and lower, and the longitudinal partition portion 86B partitions a lower portion of the FS airbag 38 into front and rear. The partition portion 86 is further provided with a circular arc-shaped partition portion 86C that connects the upper end of the longitudinal partition portion 86B with the front end of the upper-and-lower partition portion 86A. A partition cloth (dividing wall) specified inside the FS airbag 38 may structure the partition portion 86.

The front chamber 88 is specified so as to restrain a front portion of the chest C, a front portion of the abdomen B, and the head H of the occupant P, and the rear chamber 90 is specified so as to restrain a rear portion of the chest C, a rear portion of the abdomen B, and the shoulder S of the occupant P. The inflator 40 is accommodated in the rear chamber 90. The gas jetted out from the inflator 40 passes through an upper side communication aperture 92 located to the rear of the upper-and-lower partition portion 86A and passes through a lower side communication aperture 94 located below the longitudinal partition portion 86B to be supplied to the front chamber 88 (see arrows G3 and G4 in FIG. 11).

The present exemplary embodiment is structured such that, in the inflated and expanded state of the FS airbag 38, the upper end portion of the support plate 54, including the hook portion 54A, is disposed at the upper side of the seatback 14 relative to the upper-and-lower partition portion 86A. More specifically, if the inflated and expanded state of the FS airbag 38 is viewed from sideward, the structure is such that the upper end portion of the support plate 54 is disposed at the upper side of the seatback 14 relative to a virtual straight line that passes along the upper-and-lower partition portion 86A and extends toward the vehicle rear side along the line of the upper-and-lower partition portion 86A (see the single-dot chain line VL in FIG. 11). In FIG. 11, in order not to impede recognition of the upper-and-lower partition portion 86A, the virtual straight line VL is marked only at the vehicle rear side of the upper-and-lower partition portion 86A.

In the present exemplary embodiment, unintended folding of the FS airbag 38 at the upper-and-lower partition portion 86A may be prevented or inhibited during the inflation and expansion of the FS airbag 38 and during occupant restraint. In addition, the gas that is jetted out from the inflator 40 into the rear chamber 90 is flow-regulated and supplied to the front chamber 88 by passing through the upper side communication aperture 92 and the lower side communication aperture 94. Therefore, the expansion action of the front chamber 88 may be stabilized.

Fourth Exemplary Embodiment

Figure 12:
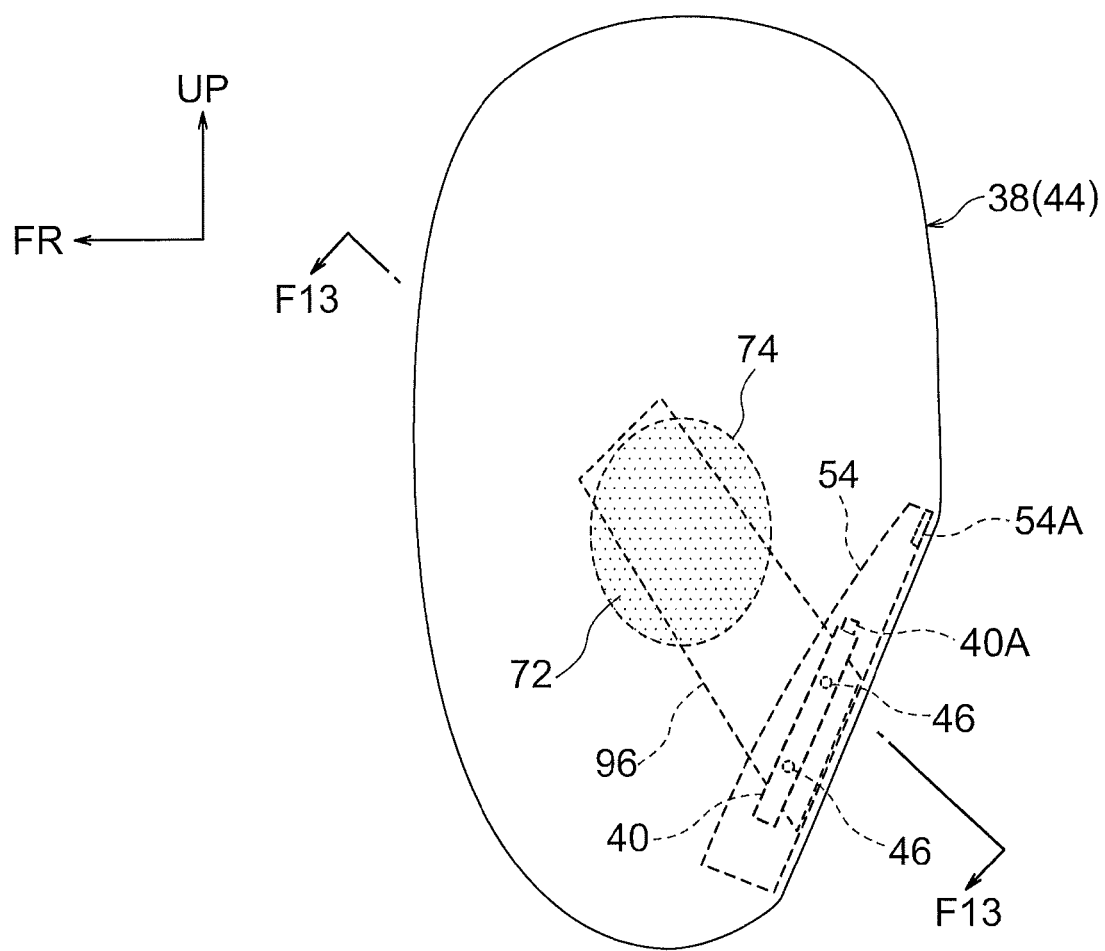
FIG. 12 is a side view in which an inflated and expanded state of a far side airbag in accordance with a fourth exemplary embodiment of the present invention is viewed from the vehicle width direction middle side thereof.
Figure 13:
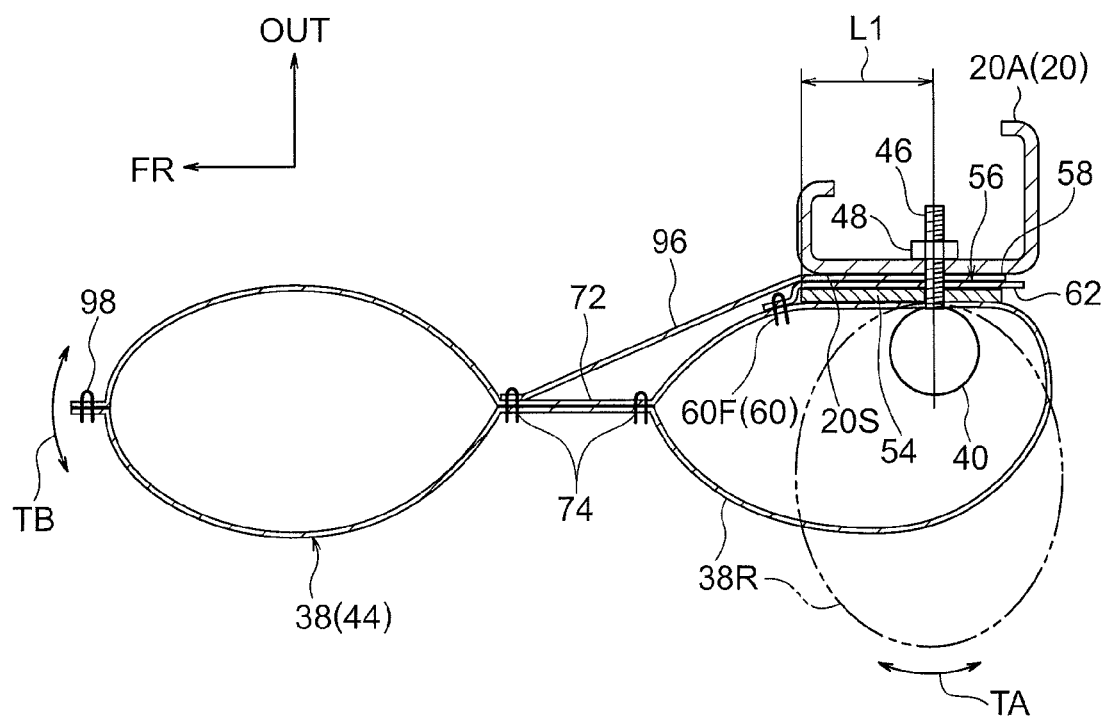
FIG. 13 is a magnified sectional view showing a magnification in a plane cut along line F13-F13 in FIG. 12.

FIG. 12 shows a side view in which the inflated and expanded state of the FS airbag 38 in accordance with a fourth exemplary embodiment of the present invention is viewed from the vehicle width direction middle side thereof. FIG. 13 shows a magnification in a plane cut along line F13-F13 of FIG. 12 in a magnified sectional view. The element to which the reference symbol 98 is assigned in FIG. 13 is an outer periphery stitched portion of the FS airbag 38. In this exemplary embodiment, the FS airbag 38 is provided with the non-inflating portion 72, similarly to the second exemplary embodiment. Further in this exemplary embodiment, an inner tether (a tether) 96 is provided spanning between the FS airbag 38 and the support plate 54. Other structures are the same as in the first exemplary embodiment.

The inner tether 96 is formed of the same material as the base cloth 44, protruding in a long, narrow belt shape. The inner tether 96 is disposed so as to be located at the vehicle width direction outer side relative to the inflated and expanded FS airbag 38 (the side thereof at which the occupant P is disposed). One length direction end portion (a front end portion) of the inner tether 96 is stitched to (anchored at) the stitched portion 74 at an upper portion side of a front end portion of the non-inflating portion 72. A length direction other end portion (a rear end portion) of the inner tether 96 is sandwiched between the support plate 54 and the side face 20S of the side frame 20A. The base cloth material 58 is interposed between the support plate 54 and the inner tether 96, and the upper and lower stud bolts 46 of the inflator 40 penetrate through both the base cloth material 58 and the inner tether 96. Thus, the inner tether 96 is fastened and fixed to the side frame 20A using the upper and lower stud bolts 46 in a state in which the length direction other end portion of the inner tether 96 is sandwiched between the support plate 54 and the side face 20S.

A length dimension of the inner tether 96 is specified such that the inner tether 96 is subject to tension in the inflated and expanded state of the FS airbag 38. Specifically, in a state in which the FS airbag 38 has expanded to a flat shape (a "flat expansion state", or "non-inflated expansion state"), the length dimension of a portion of the base cloth 44 that overlaps with the inner tether 96 is specified to be longer than the length dimension of the inner tether 96. Therefore, a tension that acts on the inner tether 96 in the inflated and expanded state of the FS airbag 38 may be made large, and the expansion action of the FS airbag 38 may be stabilized by this tension. That is, if the inner tether 96 were not provided, as illustrated by the two-dot chain line in FIG. 13, a portion 38R of the FS airbag 38 at the rear side relative to the non-inflating portion 72 (hereinafter referred to as "the rear portion 38R") might swing forward and rearward (see arrow TA in FIG. 13). With regard thereto, in the present exemplary embodiment, the rear portion 38R may be pressed to the side thereof at which the support plate 54 is disposed (the side at which the side frame 20A is disposed) by the inner tether 96 and the above-described swinging may be prevented or inhibited. Thus, this further contributes to stabilization of the expansion action of the FS airbag 38.

In addition, in the present exemplary embodiment the length direction other end portion of the inner tether 96 is sandwiched between the side face 20S of the side frame 20A and the support plate 54. In the plan sectional view shown in FIG. 13, the front end of the support plate 54 is disposed at the vehicle front side relative to the center of the inflator 40. Therefore, when the FS airbag 38 acts to turn in the direction indicated by arrow TB in FIG. 13, a moment opposing this turning may be applied to the FS airbag 38 by the inner tether 96 at a distance L1 along the vehicle longitudinal direction between the center of the inflator 40 and the front end of the support plate 54. Thus, this even further contributes to stabilization of the expansion action of the FS airbag 38. Moreover, an occupant restraint force of the FS airbag 38 may be increased by this moment, which contributes to an improvement in occupant restraint performance. Further, because the length direction other end portion of the inner tether 96 is sandwiched between the side frame 20A and the support plate 54, a wide range of the length direction other end portion of the inner tether 96 may be excellently restrained at the side frame 20A. Therefore, the above-mentioned tension and moment may be excellently produced. Below, a range of variant examples of the fourth exemplary embodiment are described.

First Variant Example

Figure 14:
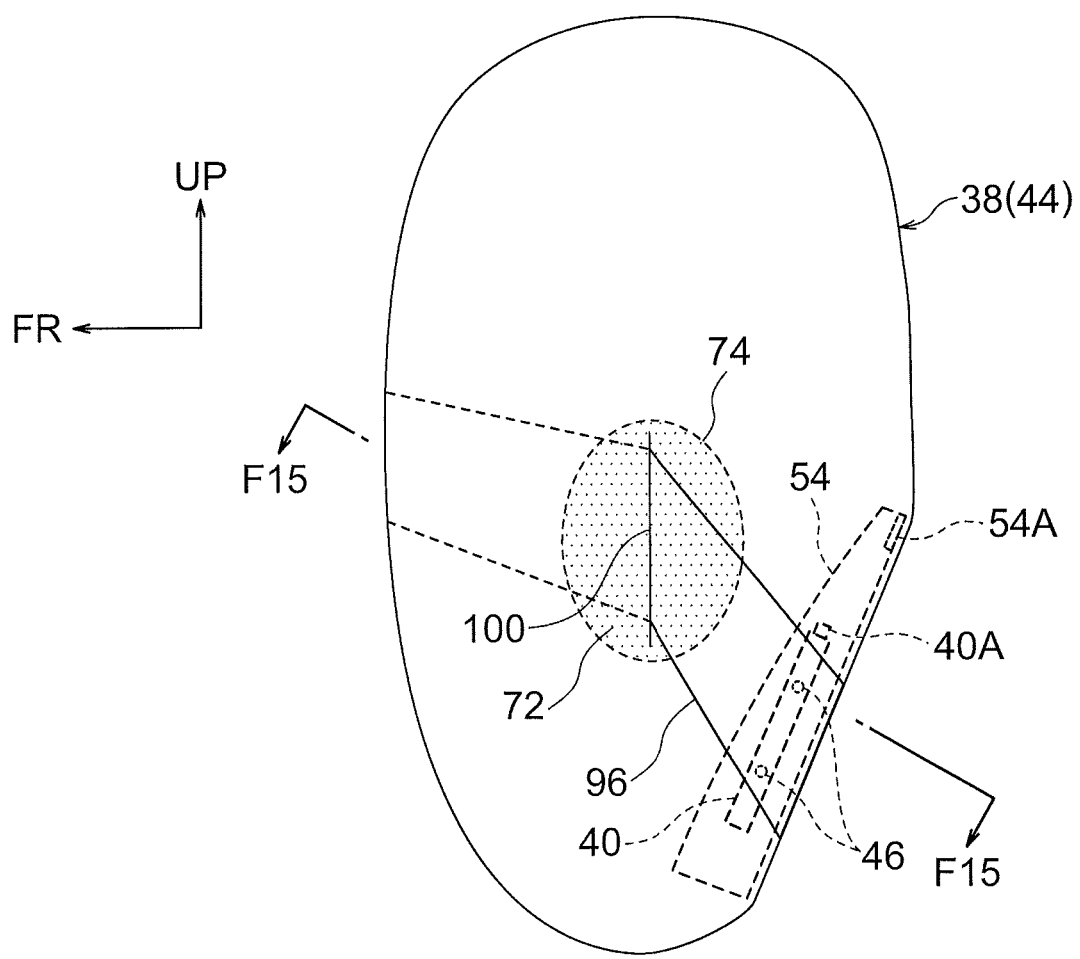
FIG. 14 is a side view corresponding to FIG. 12, showing a first variant example of the fourth exemplary embodiment.
Figure 15:
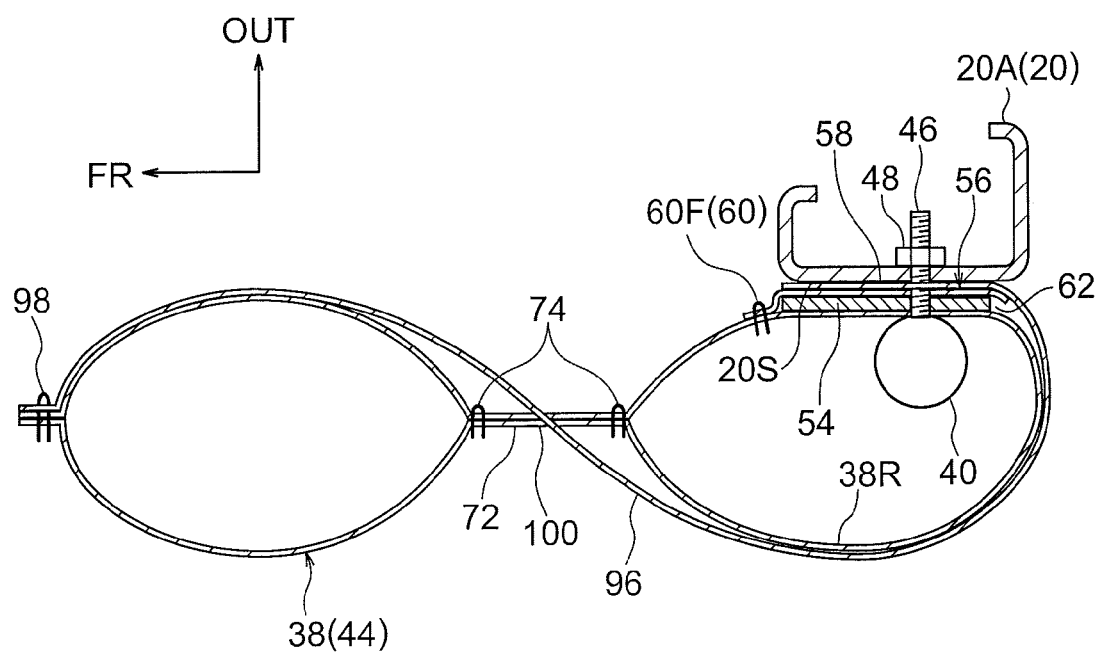
FIG. 15 is a magnified sectional view showing a magnification in a plane cut along line F15-F15 in FIG. 14.

FIG. 14 shows a first variant example of the fourth exemplary embodiment in a side view corresponding to FIG. 12. FIG. 15 shows a plane cut along line F15-F15 in FIG. 14 in a magnified sectional view. In this first variant example, the length direction one end portion of the inner tether 96 is stitched to (anchored at) a vertical direction central portion of the front end portion of the FS airbag 38 at an outer periphery stitched portion 98 of the FS airbag 38.

In the first variant example, a slit 100 that extends in the vertical direction is formed in a longitudinal direction central portion of the non-inflating portion 72. A length direction central portion of the inner tether 96 is inserted through the slit 100. Thus, the inner tether 96 is disposed such that the length direction one end side of the inner tether 96 is disposed at the vehicle width direction outer side (the side at which the occupant P is disposed) of the inflated and expanded FS airbag 38 whereas the length direction other end side of the inner tether 96 is disposed at the vehicle width direction middle side of the inflated and expanded FS airbag 38. The length direction other end side of this inner tether 96 passes to the rear of the FS airbag 38 and extends to between the side frame 20A and the support plate 54.

In the first variant example, in the flat expansion state of the FS airbag 38, the length dimension of the portion of the base cloth 44 that overlaps with the inner tether 96 is specified to be longer than the length dimension of the inner tether 96. Therefore, the tension that acts on the inner tether 96 in the inflated and expanded state of the FS airbag 38 may be made large. Moreover, because the length direction other end side of the inner tether 96 is disposed at the vehicle width direction outer side relative to the inflated and expanded FS airbag 38, the rear portion 38R may be excellently pressed to the side thereof at which the side frame 20A is disposed. Further, the tension of the inner tether 96 may act as far as the front end portion of the FS airbag 38. Thus, both the expansion action of the rear portion side of the FS airbag 38 and the expansion action of the front portion side may be stabilized.

Second Variant Example

Figure 16:
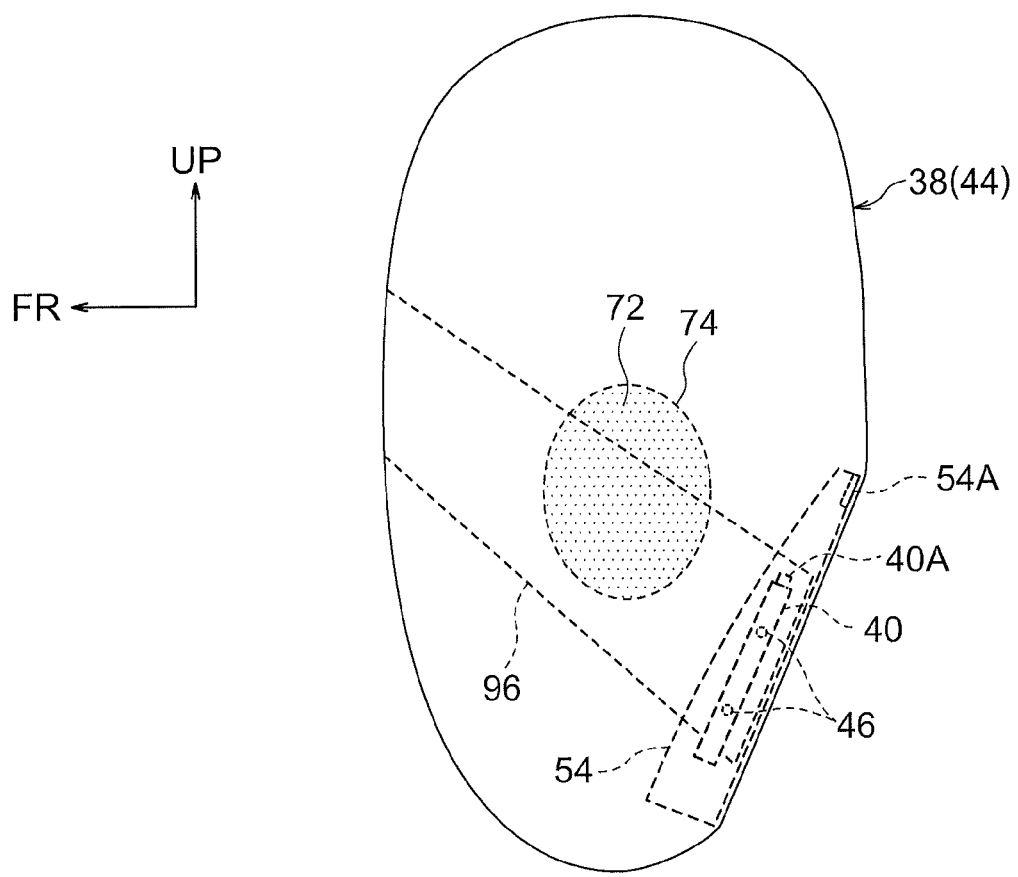
FIG. 16 is a side view corresponding to FIG. 12, showing a second variant example of the fourth exemplary embodiment.

FIG. 16 shows a second variant example of the fourth exemplary embodiment in a side view corresponding to FIG. 12. In the second variant example, similarly to the first variant example, the length direction one end portion of the inner tether 96 is stitched to the front end portion of the FS airbag 38, but the above-mentioned slit 100 is not provided. The whole of the inner tether 96 is disposed at the vehicle width direction outer side (the side at which the occupant P is disposed) relative to the inflated and expanded FS airbag 38. In this second exemplary embodiment too, both the expansion action of the rear portion side of the FS airbag 38 and the expansion action of the front portion side may be stabilized.

Third Variant Example

Figure 17:
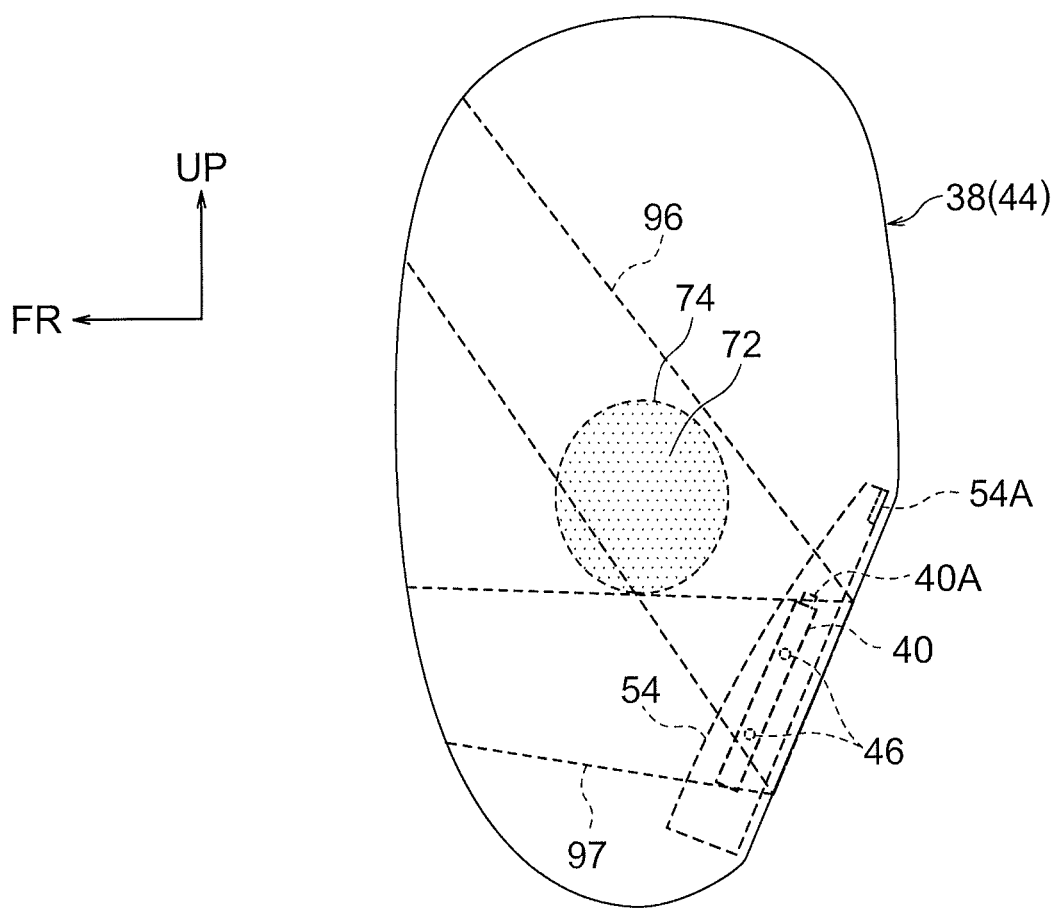
FIG. 17 is a side view corresponding to FIG. 12, showing a third variant example of the fourth exemplary embodiment.

FIG. 17 shows a third variant example of the fourth exemplary embodiment in a side view corresponding to FIG. 12. In the third variant example, the inner tether 96 at an upper side and a lower side inner tether 97 are provided. The length direction one end portion of the upper side inner tether 96 is stitched to the upper portion side of the front end portion of the FS airbag 38, and a length direction one end portion of the lower side inner tether 97 is stitched to the lower portion side of the front end portion of the FS airbag 38. The length direction other end sides of the upper and lower inner tethers 96 and 97 overlap. The upper and lower inner tethers 96 and 97 are structured such that, in the inflated and expanded state of the FS airbag 38, the length direction other end side of the upper side inner tether 96 is disposed at the vehicle width direction outer side (the side at which the occupant P is disposed) relative to the length direction other end side of the lower side inner tether 97.

In the third variant example, respectively different tensions may be made to act on the upper side inner tether 96 and the lower side inner tether 97 during the inflation and expansion of the FS airbag 38. Thus, the expansion action of the FS airbag 38 may be more finely controlled. For example, by the tension that acts on the lower side inner tether 97 being specified to be larger than the tension that acts on the upper side inner tether 96, the lower portion side of the FS airbag 38 is inflated and expanded to approach the occupant P whereas the upper portion side of the FS airbag 38 is inflated and expanded toward the vehicle width direction middle side relative to the lower portion side of the FS airbag 38. As a result, the lower portion side of the FS airbag 38 may be inflated and expanded into a narrow gap between the abdomen of the occupant P and a center console, while unintended interference of the upper portion side of the FS airbag 38 with the shoulder S from the rear side during the inflation and expansion may be prevented.

In this third variant example, the upper and lower inner tethers 96 and 97 are formed of separate cloths, but this is not limiting. For example, the upper and lower inner tethers 96 and 97 may be integrally formed of a single cloth that is cut into a "V" shape. The same applies to the fourth variant example described below.

Fourth Variant Example

Figure 18:
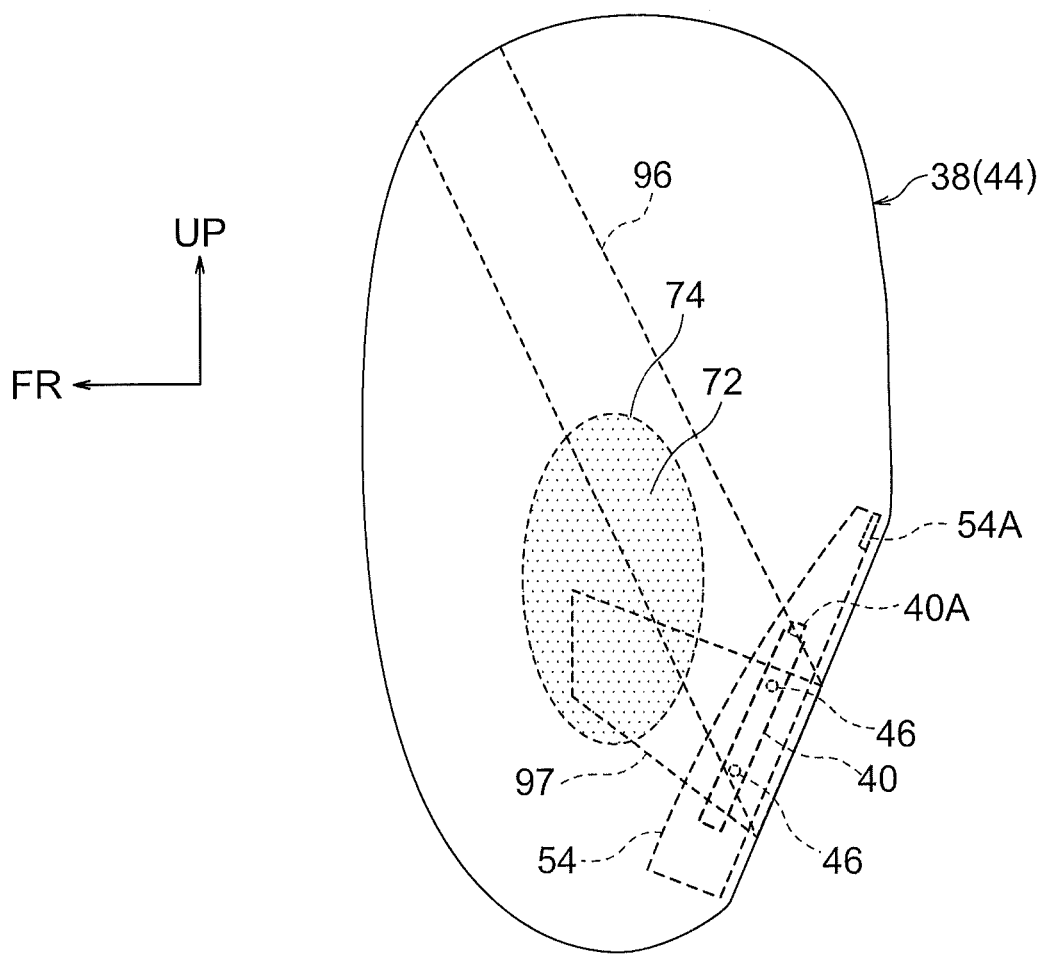
FIG. 18 is a side view corresponding to FIG. 12, showing a fourth variant example of the fourth exemplary embodiment.

FIG. 18 shows a fourth variant example of the fourth exemplary embodiment in a side view corresponding to FIG. 12. In this fourth variant example, similarly to the third variant example, the pair of upper and lower inner tethers 96 and 97 are provided. However, the length direction one end portion of the lower side inner tether 97 is stitched to the front end side of the lower portion of the non-inflating portion 72. In the fourth variant example, the lower side inner tether 97 is shorter than in the third variant example. Therefore, the moment opposing the turning of the FS airbag 38 that is mentioned in the fourth exemplary embodiment may be more greatly produced.

Fifth Exemplary Embodiment

Figure 19:
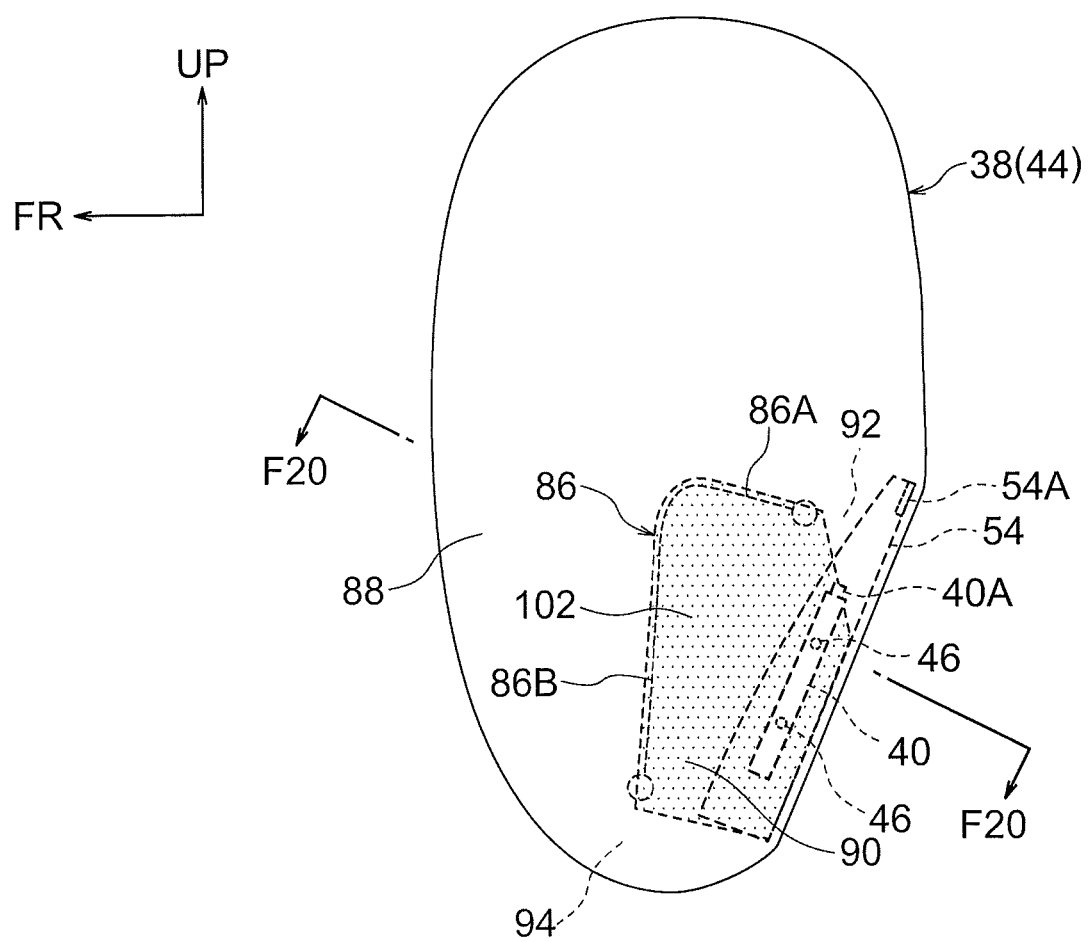
FIG. 19 is a side view in which an inflated and expanded state of a far side airbag in accordance with a fifth exemplary embodiment of the present invention is viewed from the vehicle width direction middle side thereof.
Figure 20:
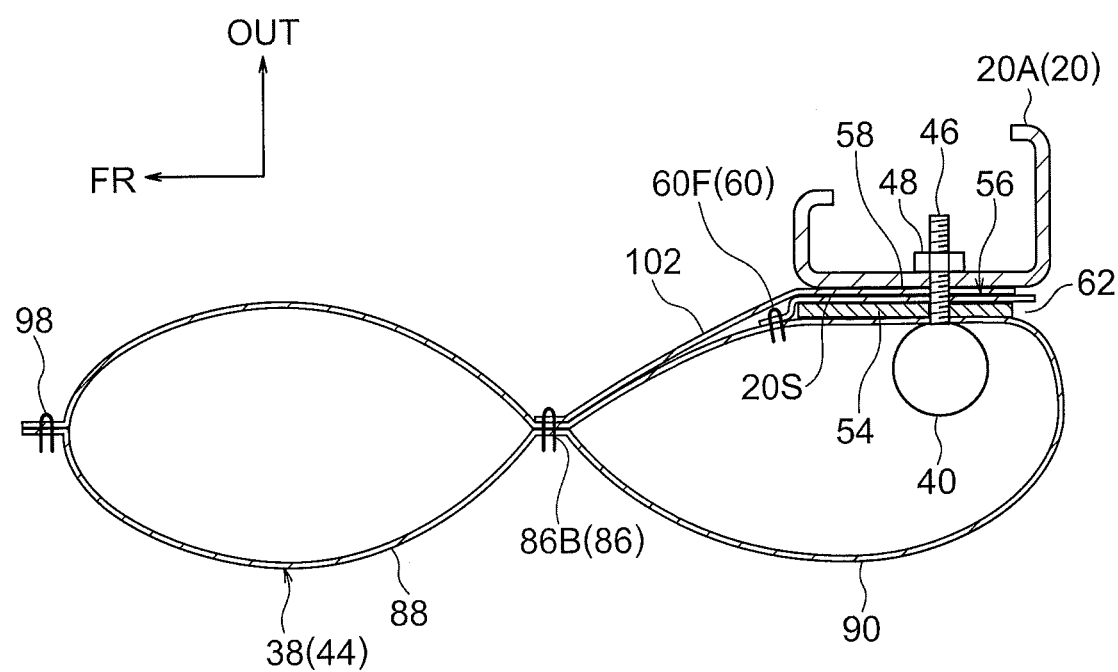
FIG. 20 is a magnified sectional view showing a magnification in a plane cut along line F20-F20 in FIG. 19.

FIG. 19 shows a side view in which the inflated and expanded state of the FS airbag 38 in accordance with a fifth exemplary embodiment of the present invention is viewed from the vehicle width direction middle side thereof. FIG. 20 shows a magnification in a plane cut along line F20-F20 of FIG. 19 in a magnified sectional view. In this exemplary embodiment, similarly to the third exemplary embodiment, the FS airbag 38 is partitioned into the front chamber 88 and the rear chamber 90 by the partition portion 86. However, in this exemplary embodiment, the circular arc-shaped partition portion 86C is not provided. The front end portion of the upper-and-lower partition portion 86A is connected to the upper end portion of the longitudinal partition portion 86B. An inner tether 102 spans between the partition portion 86 and the support plate 54. Other structures are the same as in the first exemplary embodiment. In FIG. 19, FIG. 21, and FIG. 24 to FIG. 29, the inner tether 102 and an inner tether 106 are stippled in order to facilitate recognition thereof.

The inner tether 102 is formed by cutting the same material as that of the base cloth 44 into a substantially rectangular shape (a substantially pentagonal shape). The inner tether 102 is disposed so as to be located at the vehicle width direction outer side (the side at which the occupant P is disposed) relative to the inflated and expanded FS airbag 38. A width direction one end portion (front end portion) of the inner tether 102 and a length direction one end portion (upper end portion) of the inner tether 102 are stitched to (anchored at) the FS airbag 38 at stitching portions that structure the partition portion 86. As shown in FIG. 20, a width direction other end portion (rear end portion) of the inner tether 102 is fixed to the side frame 20A using the upper and lower stud bolts 46 in a state in which the width direction other end portion is sandwiched between the base cloth material 58 (the support plate 54) and the side face 20S of the side frame 20A. In this exemplary embodiment too, similarly to the fourth exemplary embodiment, the expansion behaviour of the FS airbag 38 may be stabilized by tension acting on the inner tether 102, and an improvement in occupant restraint performance may be contributed to. Below, a range of variant examples of the fifth exemplary embodiment are described.

First Variant Example

Figure 21:
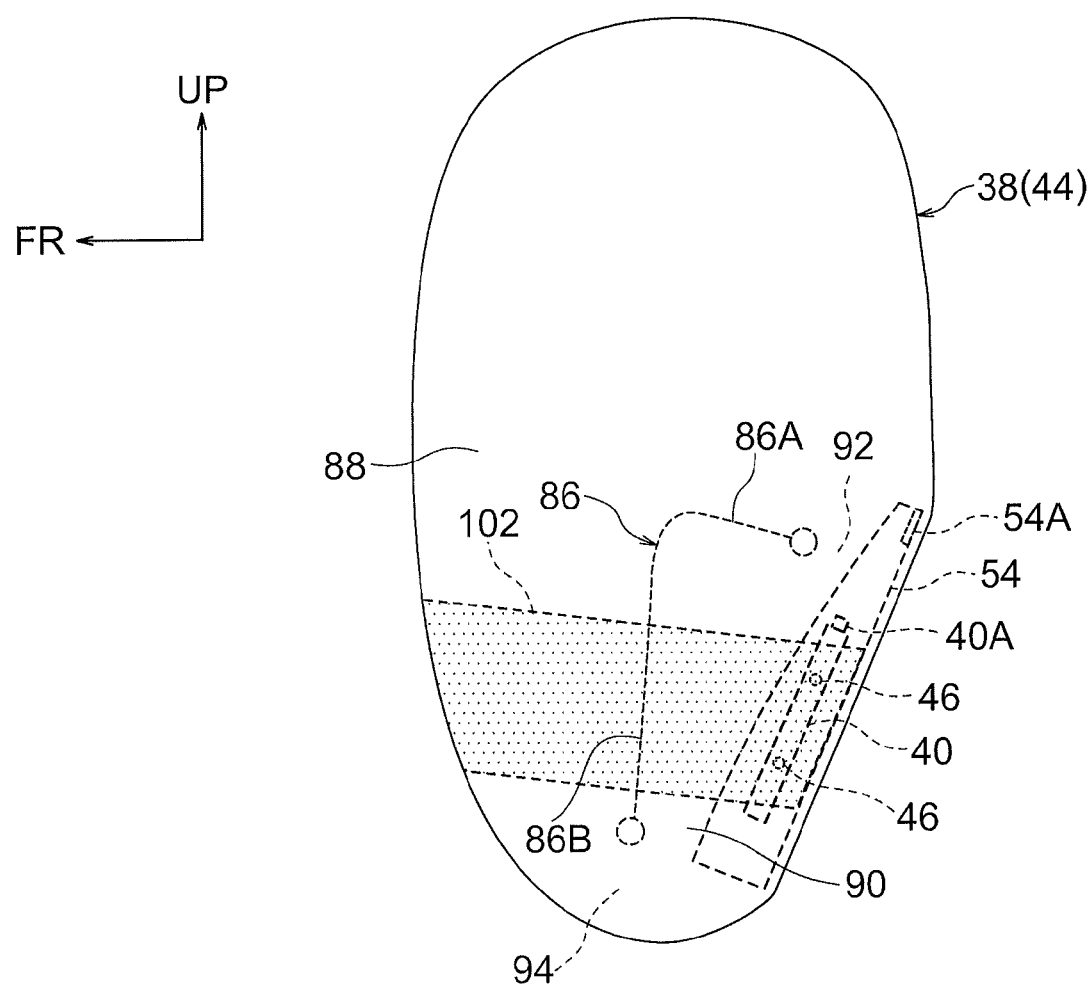
FIG. 21 is a side view corresponding to FIG. 19, showing a first variant example of the fifth exemplary embodiment.

FIG. 21 shows a first variant example of the fifth exemplary embodiment in a side view corresponding to FIG. 19. In this first variant example, the inner tether 102 is formed in a long, narrow belt shape. The length direction one end portion (front end portion) of the inner tether 102 is stitched to (anchored at) the outer periphery stitched portion 98 (not shown in the drawing of FIG. 21) at the lower portion side of the front end portion of the FS airbag 38. The length direction other end portion (rear end portion) of the inner tether 102 is fixed to the side frame 20A using the upper and lower stud bolts 46 in the state in which the length direction other end portion is sandwiched between the base cloth material 58 (the support plate 54) and the side face 20S of the side frame 20A. In this first variant example, the same operational effects are provided by this inner tether 102 as in the second variant example of the fourth exemplary embodiment (FIG. 16).

Second Variant Example

Figure 22:
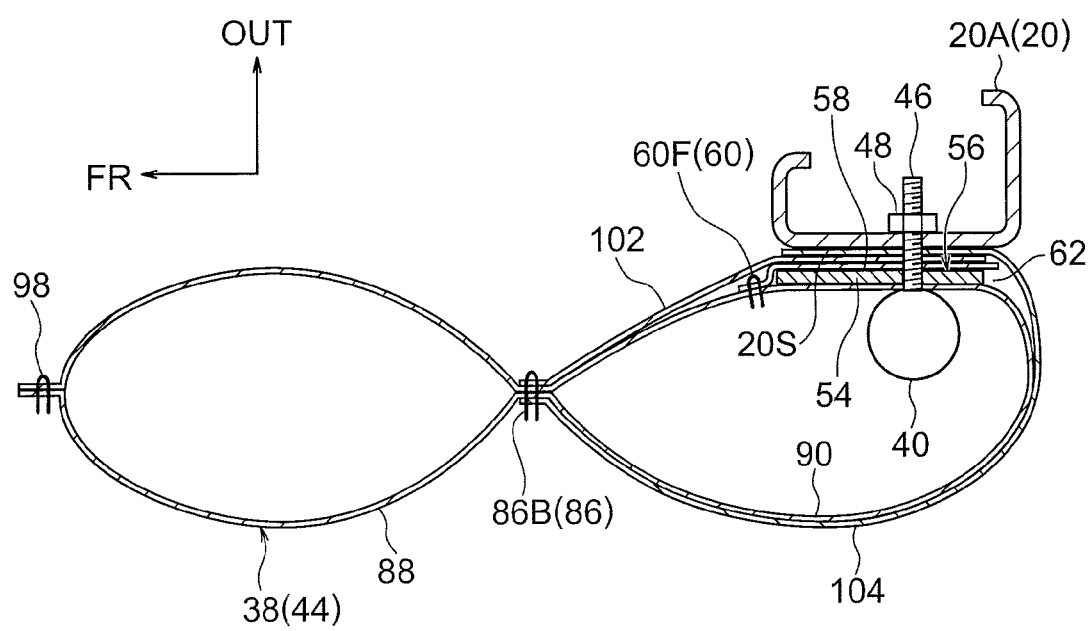
FIG. 22 is a sectional view corresponding to FIG. 20, showing a second variant example of the fifth exemplary embodiment.

FIG. 22 shows a second variant example of the fifth exemplary embodiment in a side view corresponding to FIG. 20. This second variant example has a structure in which an outer tether (a tether) 104 is added to the fifth exemplary embodiment shown in FIG. 19 and FIG. 20. The outer tether 104 is formed so as to form the same shape as the inner tether 102 shown in FIG. 19 if viewed in the vehicle width direction in the inflated and expanded state of the FS airbag 38. A width direction one end portion (front end portion) of the outer tether 104 is stitched to (anchored at) the FS airbag 38 at the partition portion 86. A width direction other end portion of the outer tether 104 passes to the rear of the FS airbag 38 and extends to between the width direction other end portion of the inner tether 102 and the side frame 20A. The width direction other end portion of the outer tether 104 is fixed to the side frame 20A using the upper and lower stud bolts 46 in the state in which the width direction other end portion is sandwiched between the width direction other end portion of the inner tether 102 and the side face 20S of the side frame 20A. In this second variant example, because the outer tether 104 is added, the expansion action of the rear portion 38R of the FS airbag 38 may be more excellently stabilized.

Third Variant Example

Figure 23:
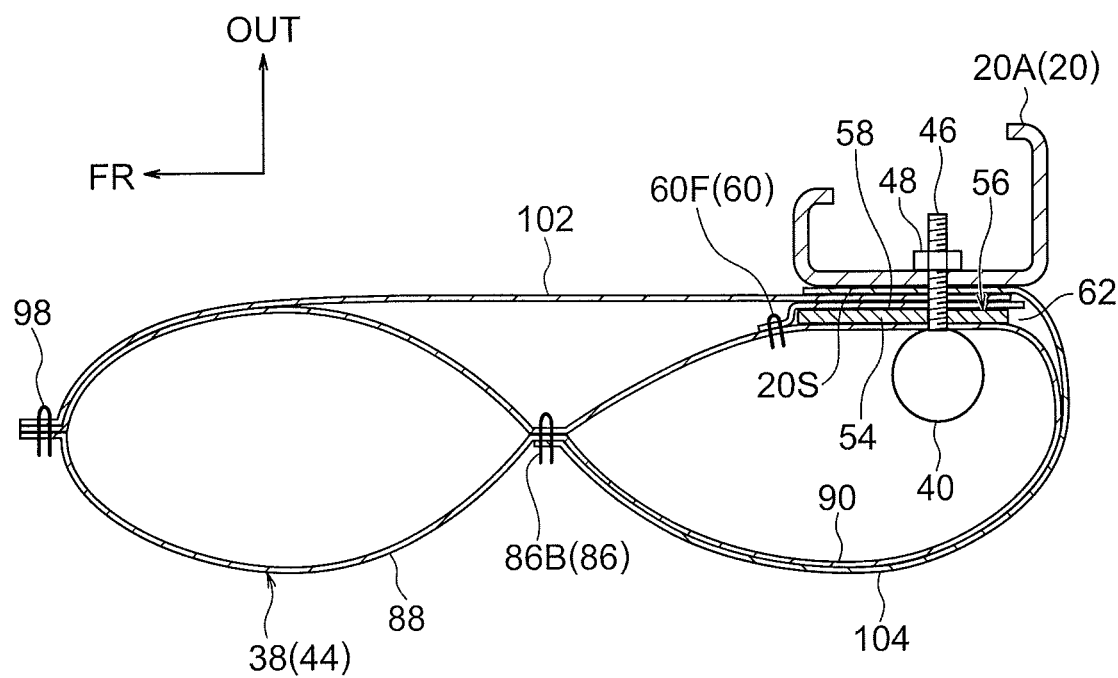
FIG. 23 is a sectional view corresponding to FIG. 20, showing a third variant example of the fifth exemplary embodiment.

FIG. 23 shows a third variant example of the fifth exemplary embodiment in a side view corresponding to FIG. 20. In this third variant example, similarly to the first variant example (FIG. 21), the front end portion of the inner tether 102 is stitched to (anchored at) the outer periphery stitched portion 98 at the lower portion side of the front end portion of the FS airbag 38. In contrast with the first variant example, the third variant example has a structure in which the outer tether 104 described above is added. In the third variant example, the effects of the second variant example (FIG. 22) may be provided in addition to the effects of the first variant example.

Fourth Variant Example

Figure 24:
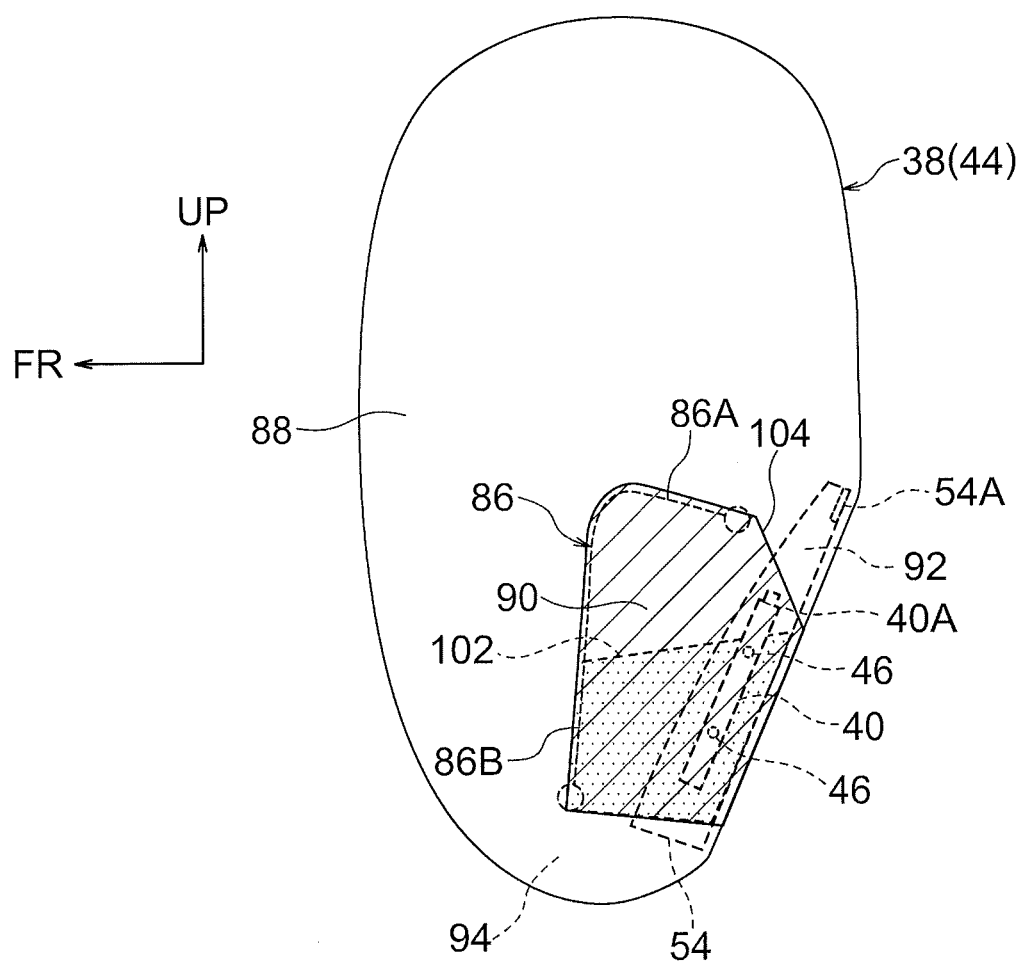
FIG. 24 is a side view corresponding to FIG. 19, showing a fourth variant example of the fifth exemplary embodiment.

FIG. 24 shows a fourth variant example of the fifth exemplary embodiment in a side view corresponding to FIG. 19. In FIG. 24 to FIG. 26, FIG. 28, and FIG. 30, the outer tether 104 and an outer tether 108 are hatched in order to facilitate recognition thereof. This fourth variant example has a structure in which the inner tether 102 is reduced in size to about half the size thereof in the second variant example (FIG. 22) and is disposed at the height of a lower half portion side of the partition portion 86. This fourth variant example may avoid unintended interference of the inner tether 102 with the shoulder S of the occupant P.

Fifth Variant Example

Figure 25:
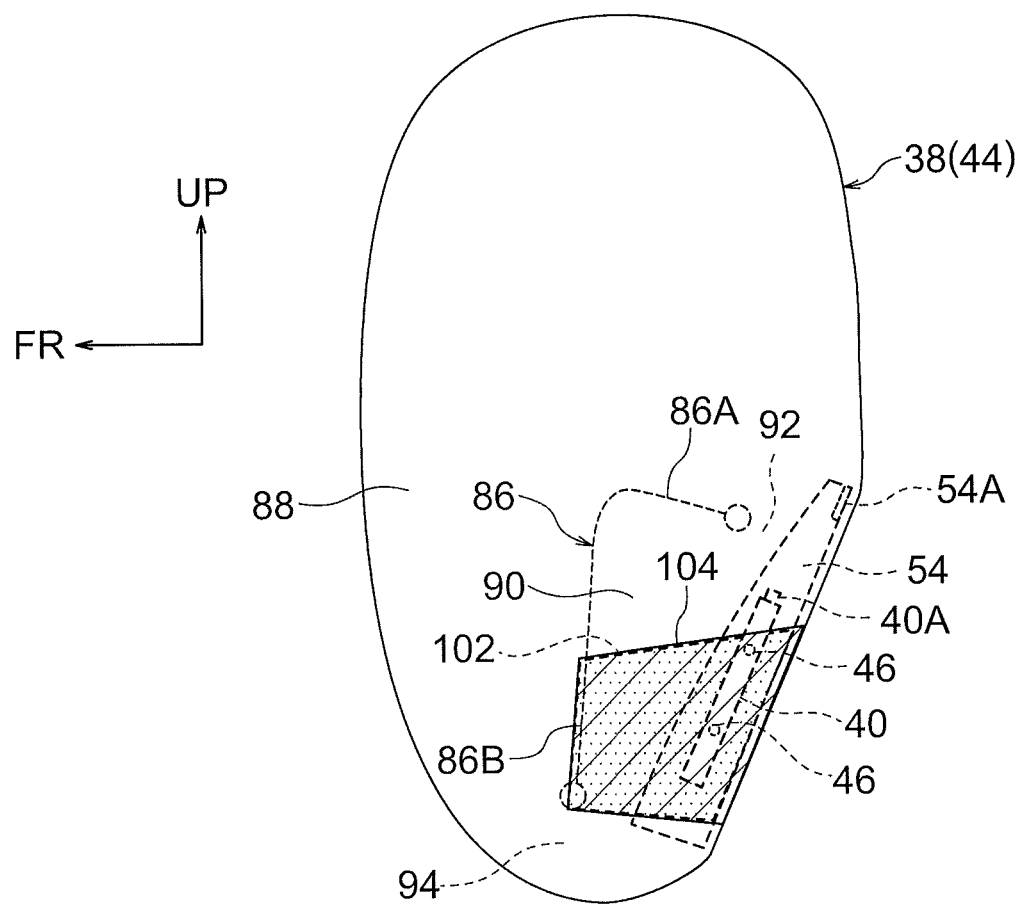
FIG. 25 is a side view corresponding to FIG. 19, showing a fifth variant example of the fifth exemplary embodiment.

FIG. 25 shows a fifth variant example of the fifth exemplary embodiment in a side view corresponding to FIG. 19. This fifth variant example has a structure in which the inner tether 102 and the outer tether 104 are reduced in size to about half the sizes thereof in the second variant example (FIG. 22) and are disposed at the height of the lower half portion side of the partition portion 86. In this fifth variant example, in addition to the effects of the fourth variant example (FIG. 24), because the tensions of the inner tether 102 and the outer tether 104 act on the lower portion side of the FS airbag 38, the lower portion side of the FS airbag 38 may be inflated and expanded to approach the occupant P whereas the upper portion side of the FS airbag 38 may be inflated and expanded toward the vehicle width direction middle side relative to the lower portion side of the FS airbag 38. Thus, effects similar to the third variant example of the fourth exemplary embodiment (FIG. 17) are provided.

Sixth Variant Example

Figure 26:
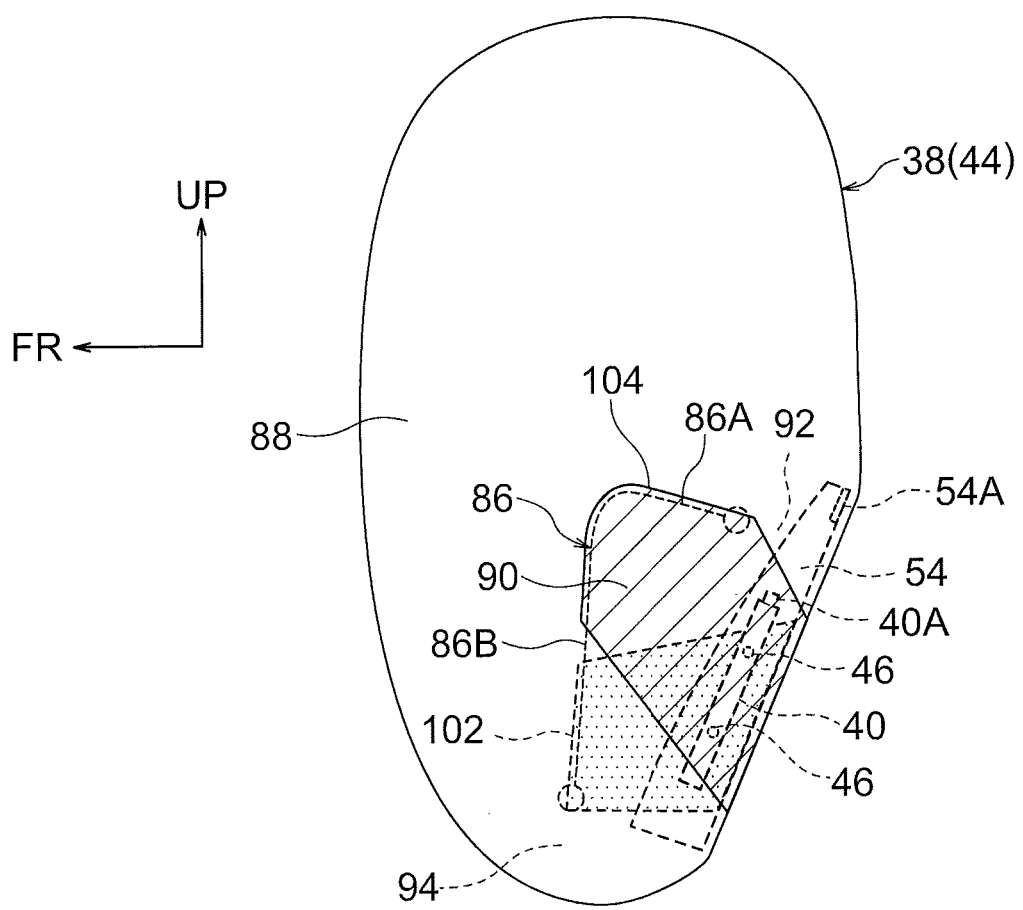
FIG. 26 is a side view corresponding to FIG. 19, showing a sixth variant example of the fifth exemplary embodiment.

FIG. 26 shows a sixth variant example of the fifth exemplary embodiment in a side view corresponding to FIG. 19. This sixth variant example has a structure in which the width direction one end portion (front end portion) of the outer tether 104 of the fifth variant example (FIG. 25) is stitched to the upper portion side of the partition portion 86. This sixth variant example is excellent if it is desired that the tension of the outer tether 104 acts more on the upper portion side of the FS airbag 38 than in the fifth variant example (FIG. 25).

Seventh Variant Example

Figure 27:
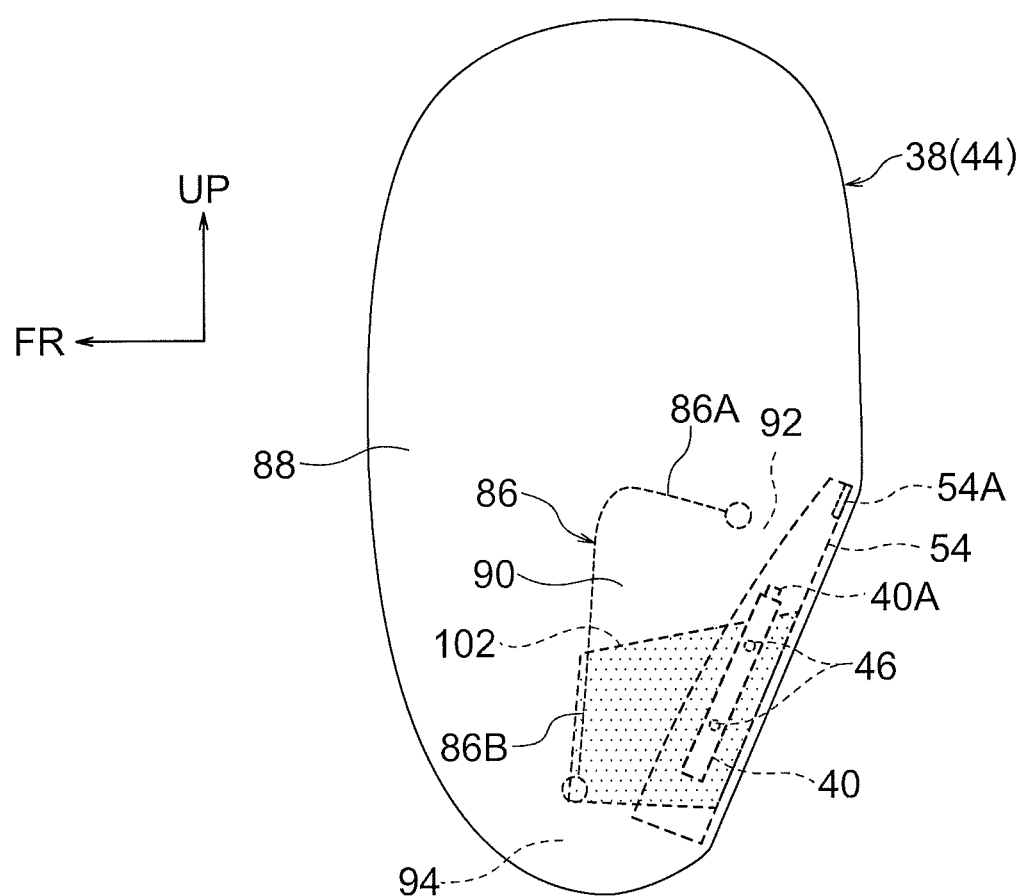
FIG. 27 is a side view corresponding to FIG. 19, showing a seventh variant example of the fifth exemplary embodiment.

FIG. 27 shows a seventh variant example of the fifth exemplary embodiment in a side view corresponding to FIG. 19. This seventh variant example has a structure in which the inner tether 102 is reduced in size to about half the size thereof in the fifth exemplary embodiment (FIG. 19 and FIG. 20) and is disposed at the height of the lower half portion side of the partition portion 86. Because this seventh variant example has a simple structure, costs may be reduced and additionally, similarly to the fourth variant example (FIG. 24), unintended interference of the inner tether 102 with the shoulder S of the occupant P may be avoided.

Eighth Variant Example

Figure 28:
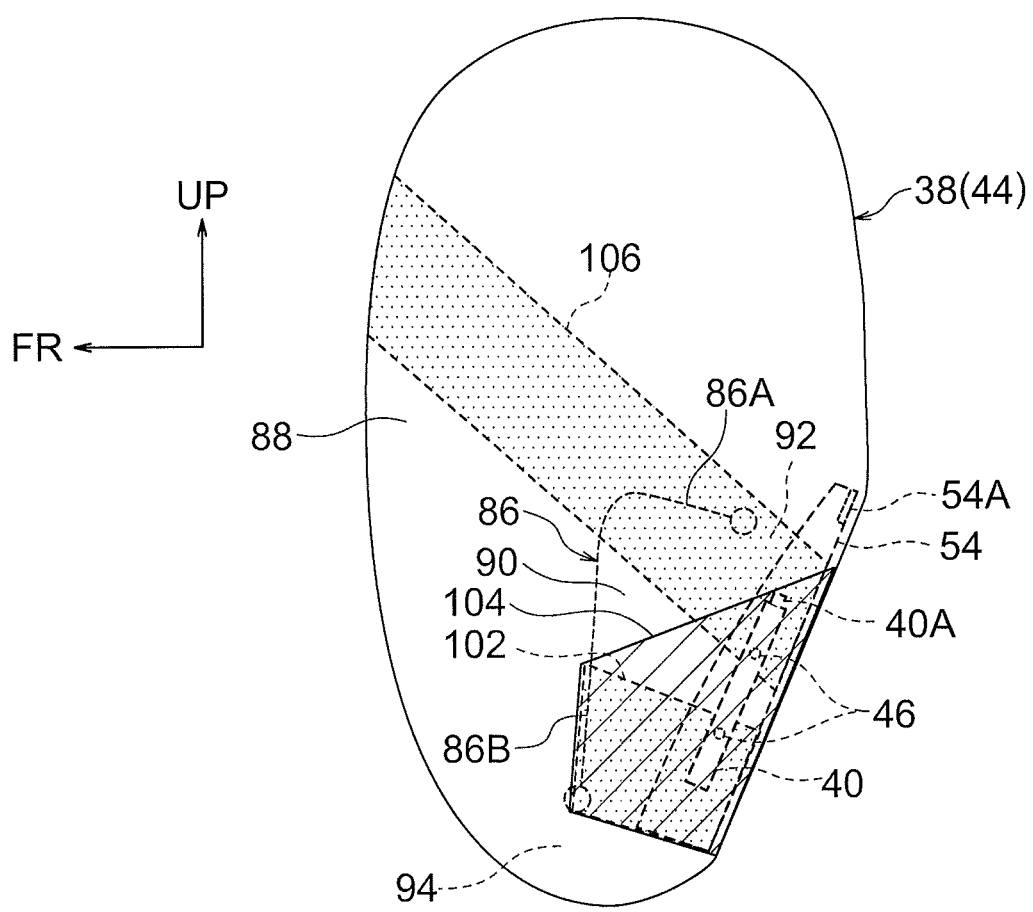
FIG. 28 is a side view corresponding to FIG. 19, showing an eighth variant example of the fifth exemplary embodiment.

FIG. 28 shows an eighth variant example of the fifth exemplary embodiment in a side view corresponding to FIG. 19. In the eighth variant example, the inner tether 102 according to the fifth variant example (FIG. 15) is reduced in size at the lower side thereof, and the separate inner tether (tether) 106 is added. The inner tether 106 is formed in a long, narrow belt shape and the length direction one end portion (front end portion) of the inner tether 106 is stitched to (anchored at) the outer periphery stitched portion 98 at the upper portion side of the front end portion of the FS airbag 38 (not shown in the drawing of FIG. 28). The length direction other end portion (rear end portion) of the inner tether 106 is fixed to the side frame 20A using the upper and lower stud bolts 46 in a state in which the length direction other end portion is sandwiched between the base cloth material 58 (the support plate 54) and the side face 20S of the side frame 20A. In the eighth variant example, because the tension of the inner tether 106 may act on the upper portion side of the front end portion of the FS airbag 38, in addition to the effects of the fifth variant example (FIG. 25), the expansion action of the upper portion side of the FS airbag 38 may be stabilized.

Ninth Variant Example

Figure 29:
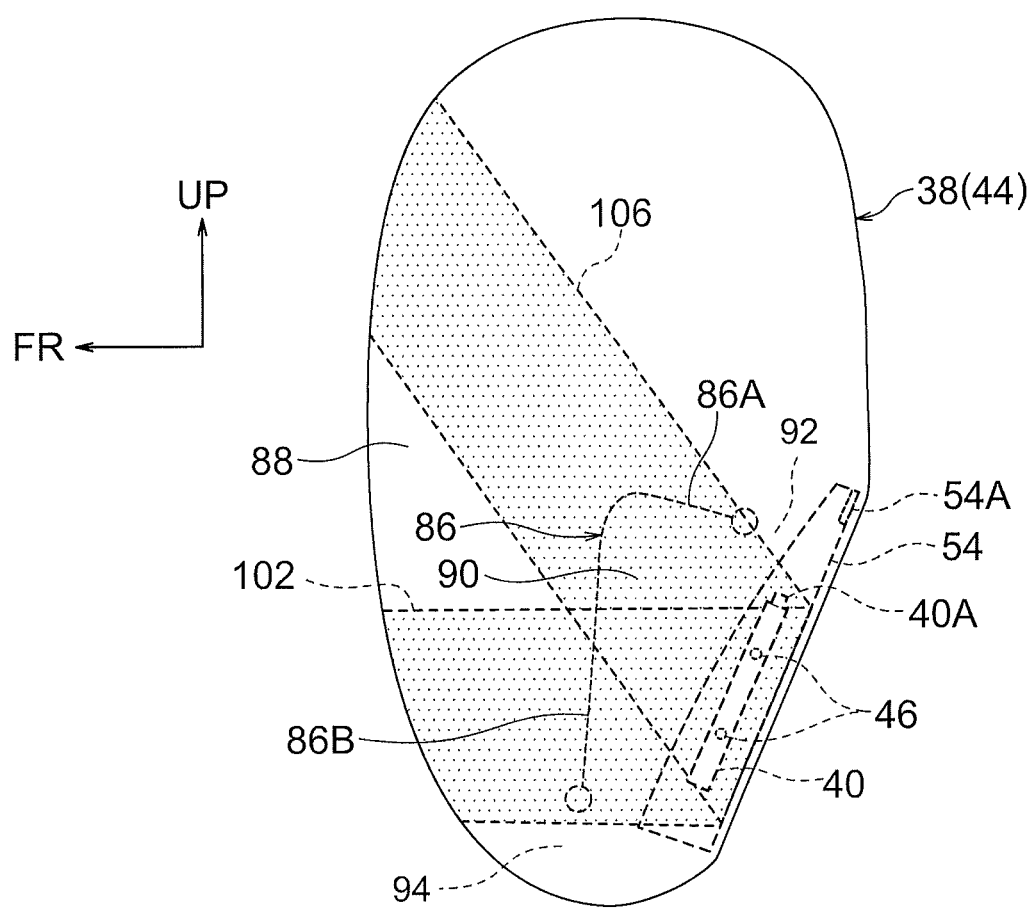
FIG. 29 is a side view corresponding to FIG. 19, showing a ninth variant example of the fifth exemplary embodiment.

FIG. 29 shows a ninth variant example of the fifth exemplary embodiment in a side view corresponding to FIG. 19. In this ninth variant example, the inner tether 106 according to the eighth variant example is added to the first variant example (FIG. 21). However, this inner tether 106 is formed with a greater vertical width than in the eighth variant example. The length direction other end portion (rear end portion) of the inner tether 106 overlaps with the length direction other end portion (rear end portion) of the inner tether 102 at the vehicle width direction outer side of the inner tether 102 (the side at which the occupant P is disposed). In the ninth variant example, in addition to the effects of the first variant example (FIG. 21), the expansion action of the upper portion side of the FS airbag 38 may be stabilized.

Tenth Variant Example

Figure 30:
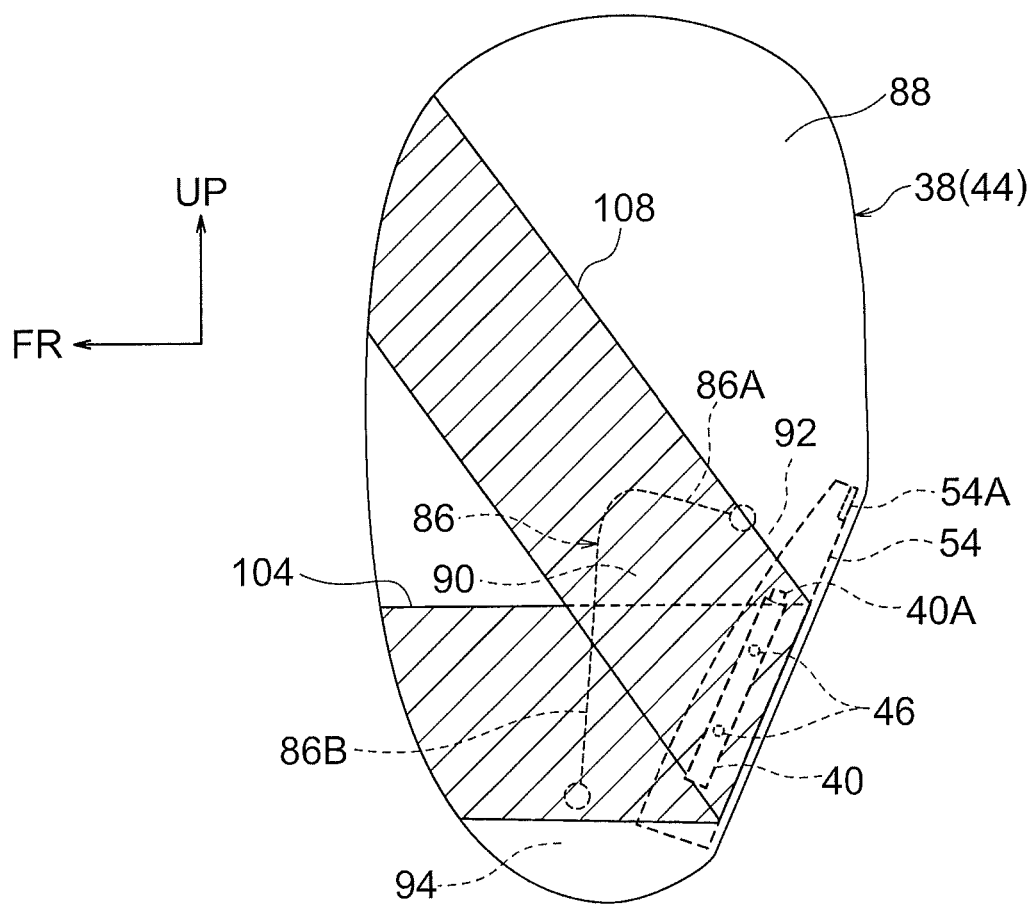
FIG. 30 is a side view corresponding to FIG. 19, showing a tenth variant example of the fifth exemplary embodiment.

FIG. 30 shows a tenth variant example of the fifth exemplary embodiment in a side view corresponding to FIG. 19. This tenth variant example is provided with the outer tethers 104 and 108 that, if the inflated and expanded state of the FS airbag 38 is viewed in the vehicle width direction, are formed in similar shapes to the inner tethers 102 and 106 according to the ninth variant example. The width direction one end portion (front end portion) of the outer tether 104 is stitched to (anchored at) the outer periphery stitched portion 98 (not shown in the drawing of FIG. 30) at the lower portion side of the front end portion of the FS airbag 38. The width direction other end portion (rear end portion) of the outer tether 104 is fixed to the side frame 20A in the same manner as the outer tether 104 illustrated in FIG. 22 and FIG. 23. The width direction one end portion (front end portion) of the outer tether 108 is stitched to (anchored at) the outer periphery stitched portion 98 at the upper portion side of the front end portion of the FS airbag 38, and the width direction other end portion (rear end portion) of the outer tether 108 is fixed to the side frame 20A in the same manner as the outer tether 104 illustrated in FIG. 22 and FIG. 23. In the tenth variant example, because the tensions of the outer tethers 104 and 108 may act on a wide range of the FS airbag 38, the expansion action of the FS airbag 38 may be effectively stabilized. Furthermore, because no tether is specified at the side at which the occupant P is disposed, unintended interference between the occupant P and a tether may be prevented.

Hereabove, a range of variant examples of the fifth exemplary embodiment have been described. For the two-chamber type of FS airbag 38 according to the fifth exemplary embodiment, 544 ways of specifying tethers by combining the following, including the above descriptions, can be considered.

(1) There are two locations of anchoring of the one end portion of an inner tether: the partition portion 86 and the front end portion of the FS airbag 38 (the outer periphery stitched portion 98).

(2) There are four vertical direction dimensions of the inner tethers: the upper side alone (only the inner tether 106); the lower side alone (only the inner tether 102); separate upper and lower bodies (the inner tethers 102 and 106 are separate bodies); and a single upper and lower body (the inner tethers 102 and 106 are a single body).

Figure 31:
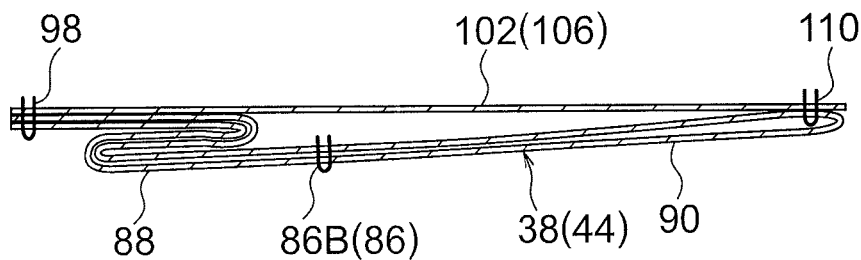
FIG. 31 is a side view illustrating an example in which a rear end portion of an outer tether in accordance with the fifth exemplary embodiment is stitched to a rear end portion of the far side airbag.

(3) There are two locations of fixing of the other end portion of an inner tether: the upper and lower stud bolts 46 and the rear end portion of the FS airbag 38 (see the stitched portion 110 in FIG. 31; the base cloth 44 is folded as shown in FIG. 31 and stitched at the stitched portion 110).

(4) Two cases: with an outer tether/outer tethers and without any outer tether.

(5) There are two locations of anchoring of the one end portion of an outer tether: the partition portion 86 and the front end portion of the FS airbag 38 (the outer periphery stitched portion 98).

(6) There are four vertical direction dimensions of the outer tethers: the upper side alone (only the outer tether 108); the lower side alone (only the outer tether 104); separate upper and lower bodies (the outer tethers 104 and 108 are separate bodies); and a single upper and lower body (the outer tethers 104 and 108 are a single body).

(7) There are two locations of fixing of the other end portion of an outer tether: the upper and lower stud bolts 46 and the rear end portion of the FS airbag 38 (see FIG. 31).

The total number of combinations of items (1) to (7) above is (1)×(2)×(3)=2×4×2=16 for the case without any outer tether in item (4) and (1)×(2)×(3)×(5)×(6)×(7)=2×4× 2×2×4×2=256 for the case with an outer tether/outer tethers, coming to 16+256=272.

In addition, there are two cases of the partition portion 86: being a stitched portion (a seam) and being a partition cloth (a dividing wall). Therefore, the total number of combinations (the number of ways of specifying the tethers) is 272×2=544.

Supplementary Descriptions of the Exemplary Embodiments

In the embodiments described above, the hook portion 54A is provided at the upper end portion of the support plate 54. However, the present invention is not limited to structures in which the upper end portion of the support plate 54 engages with the seatback frame 20 by hooking onto the edge portion of the engaging hole 68 formed in the side frame 20A.

Figure 32:
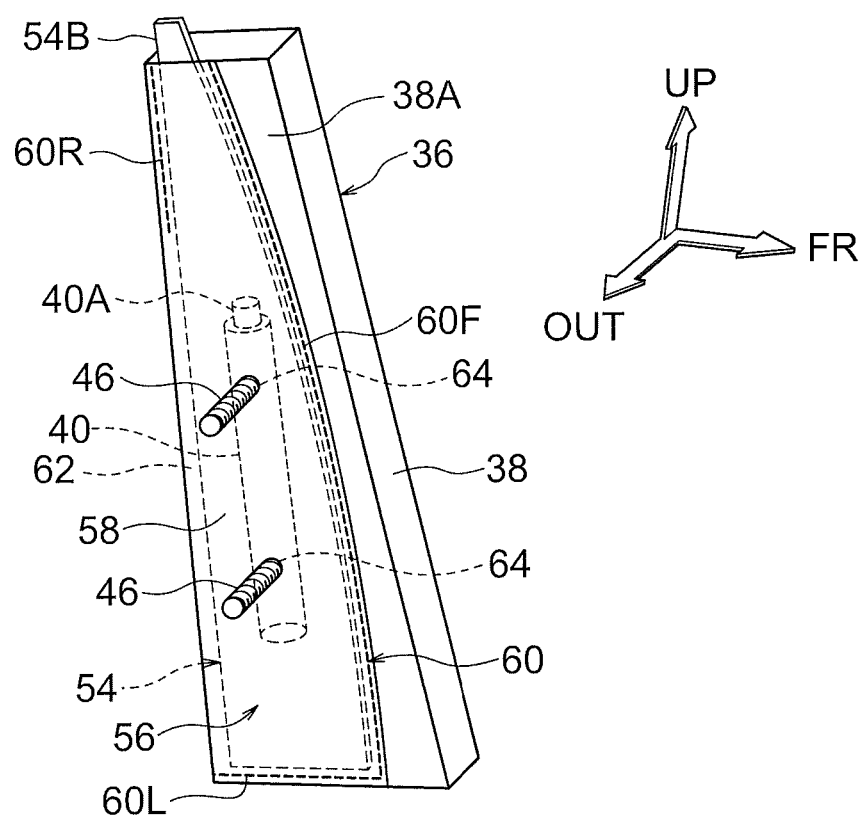
FIG. 32 is a perspective view corresponding to FIG. 5, for describing a variant example of a support plate and bag portion.
Figure 33:
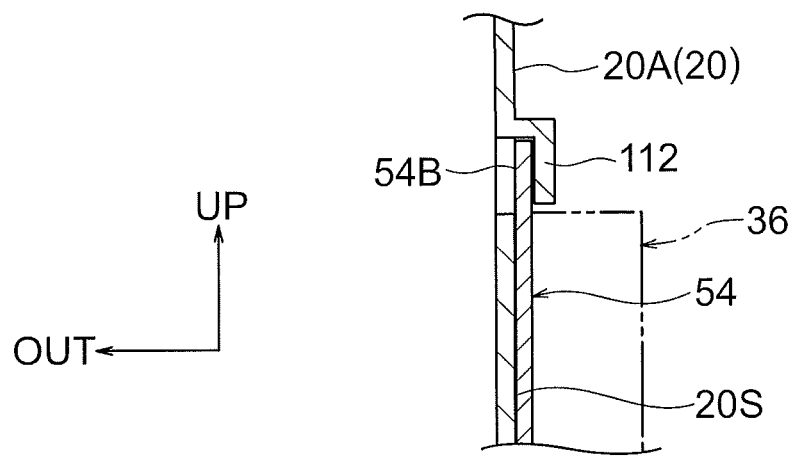
FIG. 33 is a sectional view for describing a structure that is for engaging an upper end portion of the support plate shown in FIG. 32 with a seat frame.

For example, a structure as illustrated in FIG. 32 and FIG. 33 is possible. That is, as shown in FIG. 32, the hook portion 54A and the upper portion 60U of the stitched portion 60 are not provided, but the upper end portion of the support plate 54 is lengthened upward and an insertion portion (engaging portion) 54B is formed to project above the bag portion 56. As shown in FIG. 33, a portion of the upper portion of the side frame 20A is cut and raised to project to the vehicle width direction middle side, forming a projecting cut portion 112, and the insertion portion 54B is inserted into a lower end opening of the projecting cut portion 112 from the lower side thereof. Thus, a structure may be formed in which the upper end portion of the support plate 54 engages with the seatback frame 20.

In the above exemplary embodiments, the bag portion 56 provided at the face opposite 38A of the FS airbag 38 serves as the support plate retention portion, but the present invention is not limited thus. That is, the structure of the support plate retention portion may be appropriately modified provided portions including the upper end portion and lower end portion of the support plate 54 can be retained (restrained) at the face opposite 38A of the FS airbag 38.

Figure 34:
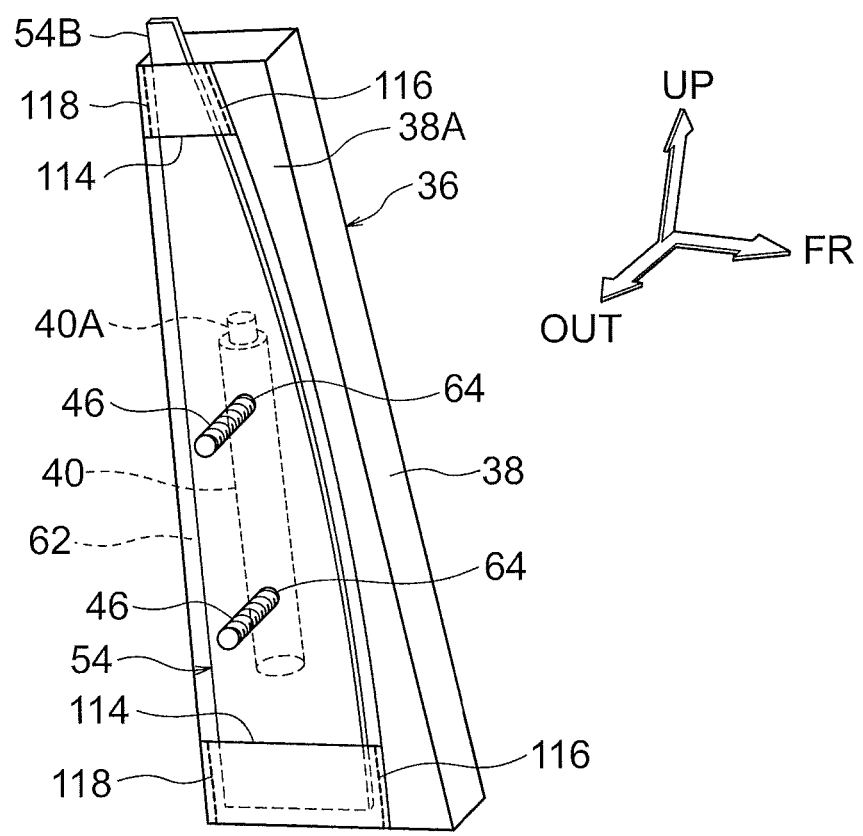
FIG. 34 is a perspective view corresponding to FIG. 5, for describing a variant example of a support plate retention portion.

For example, as shown in FIG. 34, a pair of upper and lower straps 114 provided at the upper end side and the lower end side of the face opposite 38A may be structured to serve as the support plate retention portion. The straps 114 are formed by being cut from the same material as the base cloth. Vehicle longitudinal direction both end portions of the straps 114 are stitched to the FS airbag 38 at stitched portions 116 and 118 that extend in the vehicle vertical direction. The upper end portion and lower end portion of the support plate 54 are inserted between the straps 114 and the FS airbag 38. With this structure too, the upper end portion and lower end portion of the support plate 54 may be retained at the FS airbag 38.

It will be clear that numerous modes may be embodied within a scope that does not deviate from the gist of the present invention. It will also be clear that the scope of the present invention is not to be limited to the exemplary embodiments and variant examples described above.

EXPLANATION OF THE REFERENCE NUMERALS

10 Vehicle far side airbag device
12 Vehicle seat
14 Seatback
14A Vehicle width direction middle side side portion
20 Seatback frame (seat frame)
20S Side face
38 Far side airbag
38A Face opposite
40 Inflator
44 Base cloth
46 Stud bolts
54 Support plate
54A Hook portion
56 Bag portion (support plate retention portion)
58 Base cloth material
68 Engaging hole
72 Non-inflating portion
86A Upper-And-Lower Partition portion
96, 97, 102, 106 Inner tether (tether)
114 Straps (support plate retention portion)

What is claimed is:

1. A vehicle far side airbag device comprising:
   an inflator in a vehicle width direction middle side portion of a seatback of a vehicle seat, the inflator being provided to oppose a side face of a seat frame, being fixed to the seat frame using stud bolts, and generating gas for inflation when operated;
   a far side airbag that is stowed in the side portion in a folded state, the inflator being accommodated inside the far side airbag and the far side airbag being fixed to the seat frame using the stud bolts of the inflator, being inflated and expanded by the gas for inflation, and including a support plate retention portion at a face opposite the side face; and
   a support plate that is retained at the support plate retention portion, the support plate being fixed to the seat frame using the stud bolts, being formed to be longer to both sides in a vehicle vertical direction than the inflator, and being engaged with the seat frame at a position above the inflator.

2. The vehicle far side airbag device according to claim 1, wherein the support plate retention portion is a bag portion, and the support plate is inserted inside the bag portion.

3. The vehicle far side airbag device according to claim 1, wherein the support plate is engaged with the seat frame by a hook portion formed at an upper end portion of the support plate being hooked onto the seat frame.

4. The vehicle far side airbag device according to claim 1, wherein
   a non-inflating portion is provided at a vertical direction middle portion of the far side airbag and,
   in an inflated and expanded state of the far side airbag, an upper end portion of the support plate is disposed at the vehicle upper side relative to a lower end of the non-inflating portion.

5. The vehicle far side airbag device according to claim 1, wherein
   an upper-and-lower partition portion that partitions the far side airbag into upper and lower is provided at a vertical direction middle portion of the far side airbag and,
   in an inflated and expanded state of the far side airbag, an upper end portion of the support plate is disposed at the upper side of the seatback relative to the upper-and-lower partition portion.

6. The vehicle far side airbag device according to claim 1, further comprising at least one tether of which one end portion is anchored at the far side airbag, other end portion of the tether being fixed to the seat frame using the stud bolts in a state in which the other end portion of the tether is sandwiched between the seat frame and the support plate.

7. The vehicle far side airbag device according to claim 4, further comprising at least one tether of which one end portion is anchored at the non-inflating portion, other end portion of the tether being fixed to the seat frame using the stud bolts in a state in which the other end portion of the tether is sandwiched between the seat frame and the support plate.

8. The vehicle far side airbag device according to claim 5, further comprising at least one tether of which one end portion is anchored at an upper portion side of the upper-and-lower partition portion, other end portion of the tether being fixed to the seat frame using the stud bolts in a state in which the other end portion of the tether is sandwiched between the seat frame and the support plate.

9. The vehicle far side airbag device according to claim 5, further comprising at least one tether of which one end portion is anchored at a lower portion side of the upper-and-lower partition portion, other end portion of the tether being fixed to the seat frame using the stud bolts in a state in which the other end portion of the tether is sandwiched between the seat frame and the support plate.

10. The vehicle far side airbag device according to claim 6, wherein
    one end portion of one of the at least one tether is anchored at an upper portion side of a front end portion of the far side airbag.

11. The vehicle far side airbag device according to claim 6, wherein
    one end portion of one of the at least one tether is anchored at a lower portion side of a front end portion of the far side airbag.

12. The vehicle far side airbag device according to claim 6, wherein
    an other end portion of one of the at least one tether passes to a rear of the far side airbag and is fixed to the seat frame using the stud bolts in a state in which the other end portion of the tether is sandwiched between the seat frame and the support plate.

13. The vehicle far side airbag device according to claim 4, further comprising:
    at least one tether of which one end portion is anchored at the far side airbag; and
    a slit that extends in the vertical direction is formed in a longitudinal direction central portion of the non-inflating portion, other end of the at least one tether being inserted through the slit, passing to a rear of the far side airbag and being fixed to the seat frame using the stud bolts in a state in which the other end portion of the tether is sandwiched between the seat frame and the support plate.

* * * * *